United States Patent [19]

Emoto et al.

[11] Patent Number: 4,913,997

[45] Date of Patent: Apr. 3, 1990

[54] DISAZO ELECTROPHOTOGRAPHIC PHOTORECEPTOR

[75] Inventors: Kazuhiro Emoto; Kozo Haino, both of Nagaokakyo, Japan

[73] Assignee: Mitsubishi Paper Mills Limited, Tokyo, Japan

[21] Appl. No.: 296,129

[22] Filed: Jan. 12, 1989

[30] Foreign Application Priority Data

Dec. 2, 1988 [JP] Japan .................. 63-306634

[51] Int. Cl.⁴ ............................... G03G 5/06
[52] U.S. Cl. ........................ 430/76; 430/77; 430/78; 430/79; 534/804
[58] Field of Search .............. 430/76, 77, 78, 79; 534/804

[56] References Cited

U.S. PATENT DOCUMENTS 4,702,983 10/1987 Haino et al. ................. 430/76

FOREIGN PATENT DOCUMENTS 0234247 9/1987 European Pat. Off. .
3538830 4/1986 Fed. Rep. of Germany .

*Primary Examiner*—Roland E. Martin
*Attorney, Agent, or Firm*—Cushman, Darby & Cushman

[57] ABSTRACT

This provides an electrophotographic photoreceptor high in durability and sensitivity which comprises an electroconductive support and, provided thereon, a photosensitive layer containing an azo pigment represented by the formula [I]:

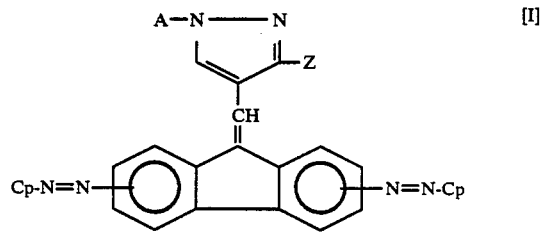

wherein A represents an aryl group, a heterocyclic group or an alkyl group, Z represents a hydrogen atom, —B or —CH=CH—B wherein B represents an aryl group, a heterocyclic group or an alkyl group and Cp represents a coupler residue.

3 Claims, 6 Drawing Sheets

FIG. 1 IR SPECTRUM OF 1,3-DIPHENYL-4-(2',7'-DIAMINOFLUORYDENE)-PYRAZOLE

IR SPECTRUM OF 1-(4"-CHLOROPHENYL)-3-PHENYL-(2',7'-DIAMINOFLUORYDENE)-PYRAZOLE

SPECTRAL SENSITIVITY CURVE OF
PHOTORECEPTOR OBTAINED IN EXAMPLE 11

IR SPECTRUM OF DIAMINOBASE

WAVELENGTH (cm$^{-1}$)

SPECTRAL SENSITIVITY OF PHOTORECEPTOR OBTAINED IN EXAMPLE 37

DISAZO ELECTROPHOTOGRAPHIC PHOTORECEPTOR

BACKGROUND OF THE INVENTION

This invention relates to an electrophotographic photoreceptor and, particularly, to a novel electrophotographic photoreceptor having a photosensitive layer containing an azo pigment. More particularly, it relates to a highly durable electrophotographic photoreceptor high insensitivity and suitable for repeated use.

Hitherto, there have been widely known those having a photosensitive layer mainly composed of inorganic photoconductive materials such as selenium, zinc oxide and cadmium sulfide.

However, these photoreceptors are not necessarily satisfactory in sensitivity, thermal stability, moisture resistance and durability. Especially, the toxicity of selenium and cadmium sulfide imposes some restriction on their manufacture and handling.

On the other hand, recently, electrophotographic photoreceptors having a photosensitive layer mainly composed of an organic photoconductive compound have attracted much attention because of the ease of their manufacture and thermal stability superior to the selenium photoreceptors.

A well known organic photoconductive compound is poly-N-vinylcarbazole. However, an electrophotographic photoreceptor having a photosensitive layer mainly composed of a charge transfer complex formed from the poly-N-vinylcarbazole and a Lewis acid such as 2,4,7-trinitro-9-fluorenone is not necessarily satisfactory in sensitivity and durability.

Photoreceptors of functionally separated type such as a laminated type and a dispersion type, in which the carrier generating function and the carrier transfer function are respectively borne by different substances have advantages that the materials can be selected from a wide range and thus electrophotographic photoreceptors having any of characteristics such as charge characteristic, sensitivity and durability can be relatively easily produced.

Hitherto, various carrier generating materials and carrier transfer materials have been proposed.

For example, electrophotographic receptors have been put to practical use which has a photosensitive layer comprising a combination of a carrier generating layer comprising amorphous selenium and a carrier transfer layer mainly composed of poly-N-vinylcarbozole. However, the carrier generating layer comprising amorphous selenium is inferior in durability.

Furthermore, use of organic dyes and pigments as a carrier generating material has been proposed and, for example, electrophotographic photoreceptors containing monoazo pigment or bisazo pigment in the photosensitive layer are disclosed in Japanese Patent Kokoku No. 48-30513, Japanese Patent Kokai Nos. 52-4241 and 54-46558 and Japanese Patent Kokoku No. 56-11945. However, these azo pigments are not completely satisfactory in sensitivity, residual potential and stability in repeated use and besides, scope of selection of carrier transfer materials is limited. Thus, the fact is that there are no electrophotographic photoreceptors which fully meet a wide variety of requirements of the electrophotographic process.

SUMMARY OF THE INVENTION

An object of this invention is to provide an electrophotographic photoreceptor containing an azo pigment which is stable against heat and light and is excellent in carrier generating ability.

Another object of this invention is to provide an electrophotographic photoreceptor high in sensitivity, small in residual potential and excellent in durability, these properties being unaffected by repeated use.

Still another object of this invention is to provide an electrophotographic photoreceptor which contains an azo pigment capable of effectively functioning as carrier generating material even in combination with a wide variety of carrier transfer materials.

DESCRIPTION OF THE INVENTION

Figure 1:
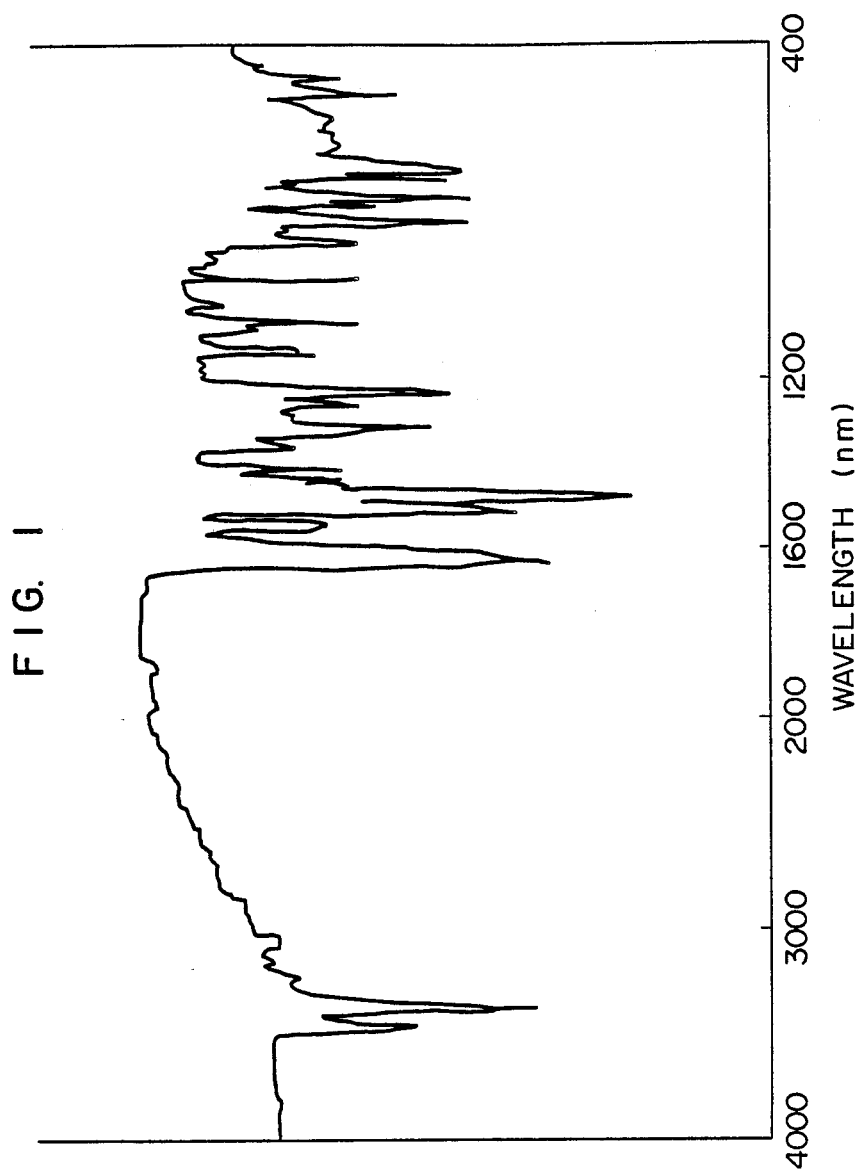
FIG. 1 is an IR spectrum of diamino compound in Synthesis Example 1.

As a result of the inventors' intensive research, it has been found that the azo pigments represented by the following formula [I] can serve as effective component of photoreceptors. This invention is based on this finding.

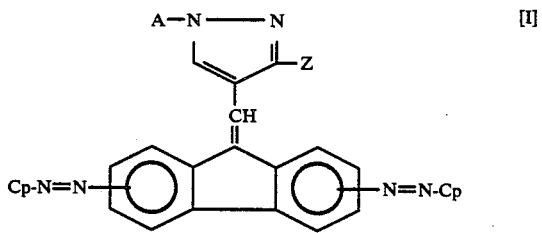

(wherein A represents an aryl group, a heterocyclic group or an alkyl group, Z represents a hydrogen atom, —B or —CH=CH—B wherein B represents an aryl group, a heterocyclic group or an alkyl group and Cp represents a coupler residue).

Cp represents a residue of a coupler which reacts with diazo group and especially effective coupler residues are as shown by the following formula (II).

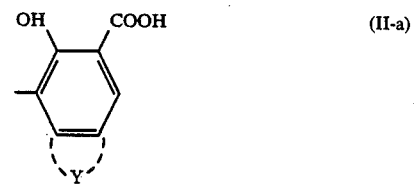

-continued

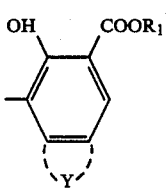 (II-b)

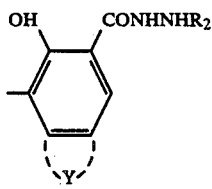 (II-c)

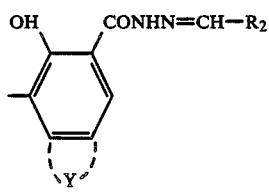 (II-d)

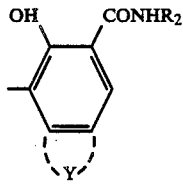 (II-e)

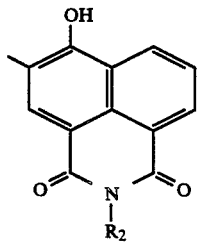 (II-f)

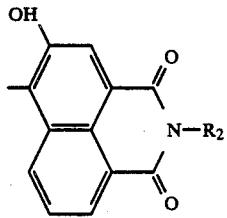 (II-g)

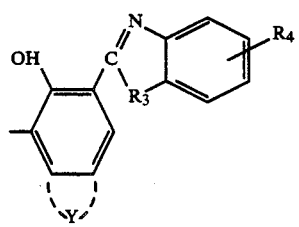 (II-h)

-continued

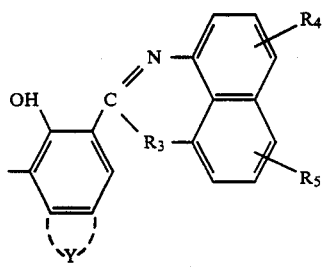 (II-i)

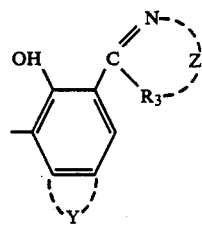 (II-j)

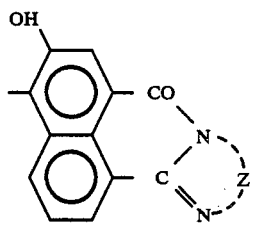 (II-k)

[wherein Y represents a group of atoms necessary to form a polycyclic aromatic ring such as, for example, naphthalene or anthracene ring by condensation with a benzene ring or to form a heterocyclic ring such as, for example, carbazole ring, benzocarbazole ring or dibenzofuran ring by condensation with benzene ring; $R_1$ represents an alkyl group which may be substituted (e.g., methyl, ethyl, n-propyl, iso-propyl, n-butyl, sec-butyl, amyl, 1-octyl, benzyl, p-chlorobenzyl, 3,4-dichlorobenzyl, p-methylbenzyl, 2-phenylethyl, α-naphthylmethyl and β-naphthylmethyl) or an aryl group which may be substituted (e.g., phenyl, ethylphenyl, tolyl, xylyl, biphenyl, chlorophenyl, dichlorophenyl, bromophenyl, methoxyphenyl, ethoxyphenyl, butoxyphenyl, phenoxyphenyl, nitrophenyl, cyanophenyl, hydroxyphenyl, carboxyphenyl, N,N-dimethylaminophenyl, α,α,α-trifluoromethylphenyl, methylthiophenyl, α-naphthyl and β-naphthyl); $R_2$ represents the same group as for $R_1$ or a heterocyclic group (e.g., thiazolyl, 5-nitrothiazolyl, carbazolyl, indolyl, pyrrolyl, acridyl, benzo(b)thiophenyl, benzoinimidazolyl, oxazolyl, chloroxazolyl, triazolyl, piperidyl, pyridyl and quinolyl); $R_3$ represents O, S or —NH—, $R_4$ and $R_5$ each represents a hydrogen atom, an alkyl which may be substituted, a nitro group, a methoxy group, an ethoxy group, an acetyl group, a cyano group or a halogen atom; and Z represents a chain hydrocarbon group necessary to form a 5- or 6-membered ring].

That is, according to this invention, an electrophotographic photoreceptor which is excellent in film properties and electrophotographic characteristics such as charge retention, sensitivity and residual potential, is suceptible to little deterioration due fatigue after repeated use, shows no change in said characteristics against exposure to heat and light and thus can exhibit stable characteristics can be produced by using the azo pigment represented by the above formula [I] as a photoconductive material in a photosensitive layer of the electrophotographic photoreceptor and as a carrier generating material of the functionally separated type, in which generation and transfer of carrier are performed by different materials by utilizing only the superior carrier generating ability of the azo pigment.

Examples of the azo pigments represented by the above formulas and useful in this invention include those which have the following structural formulas, but this invention is not limited thereto.

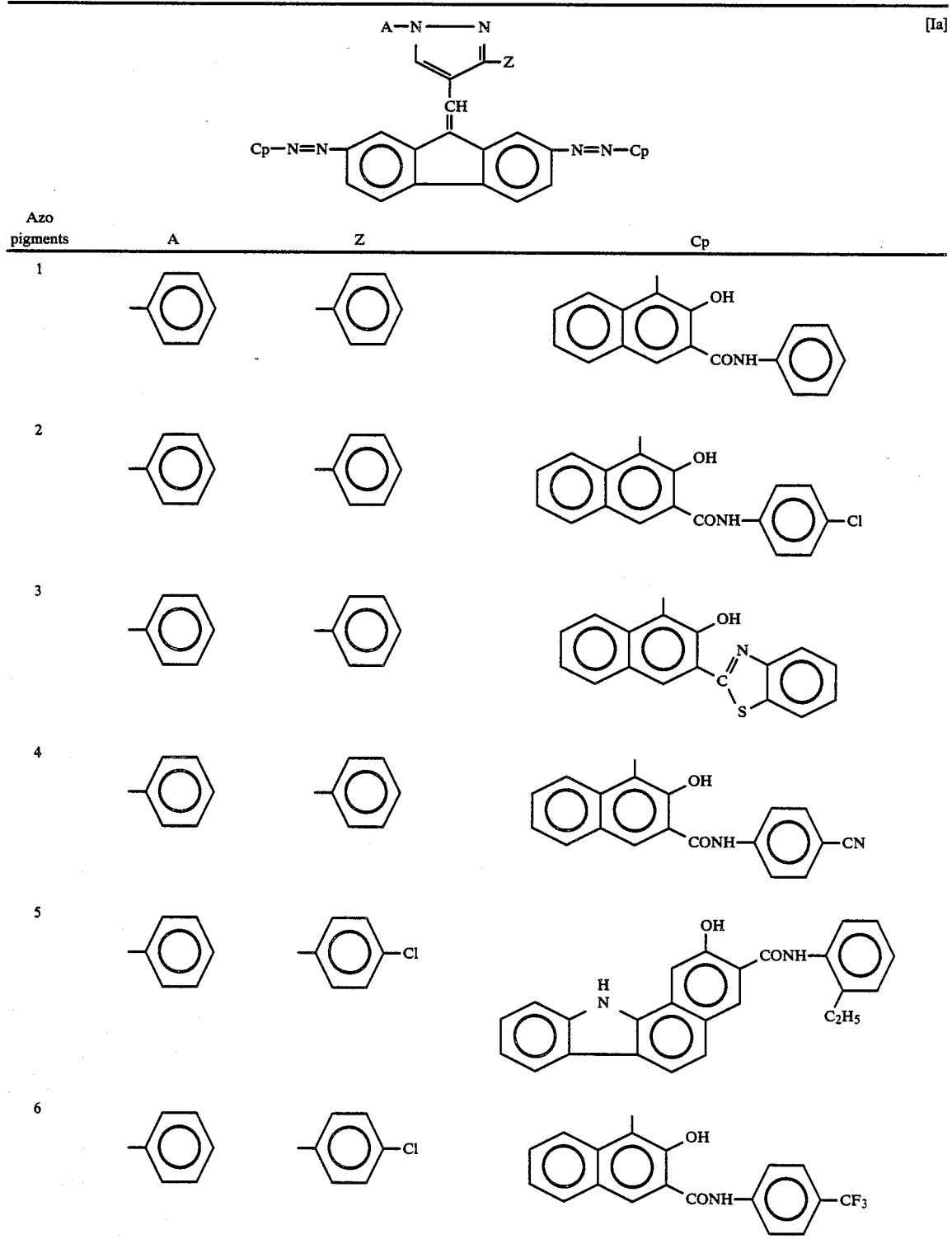

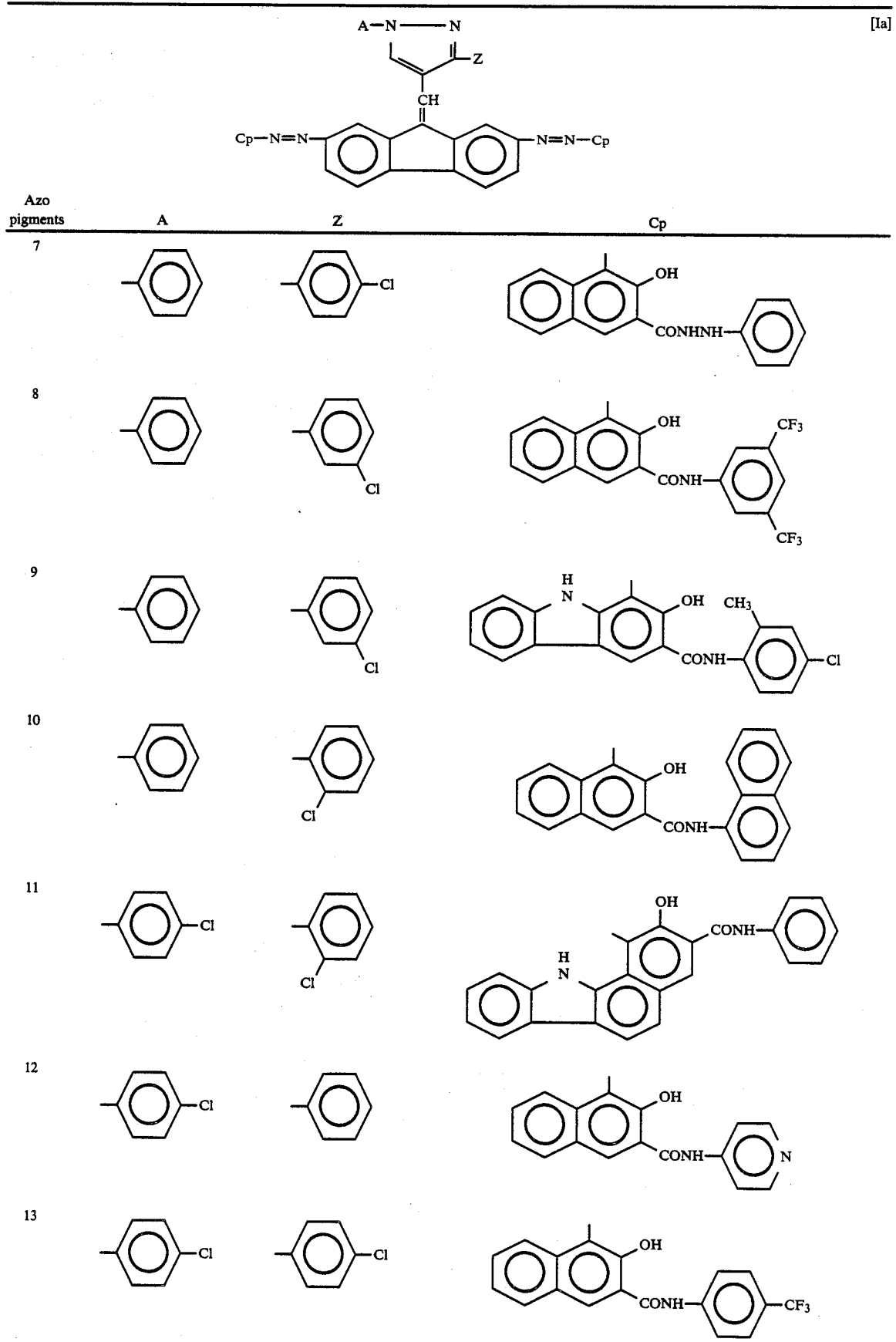

-continued
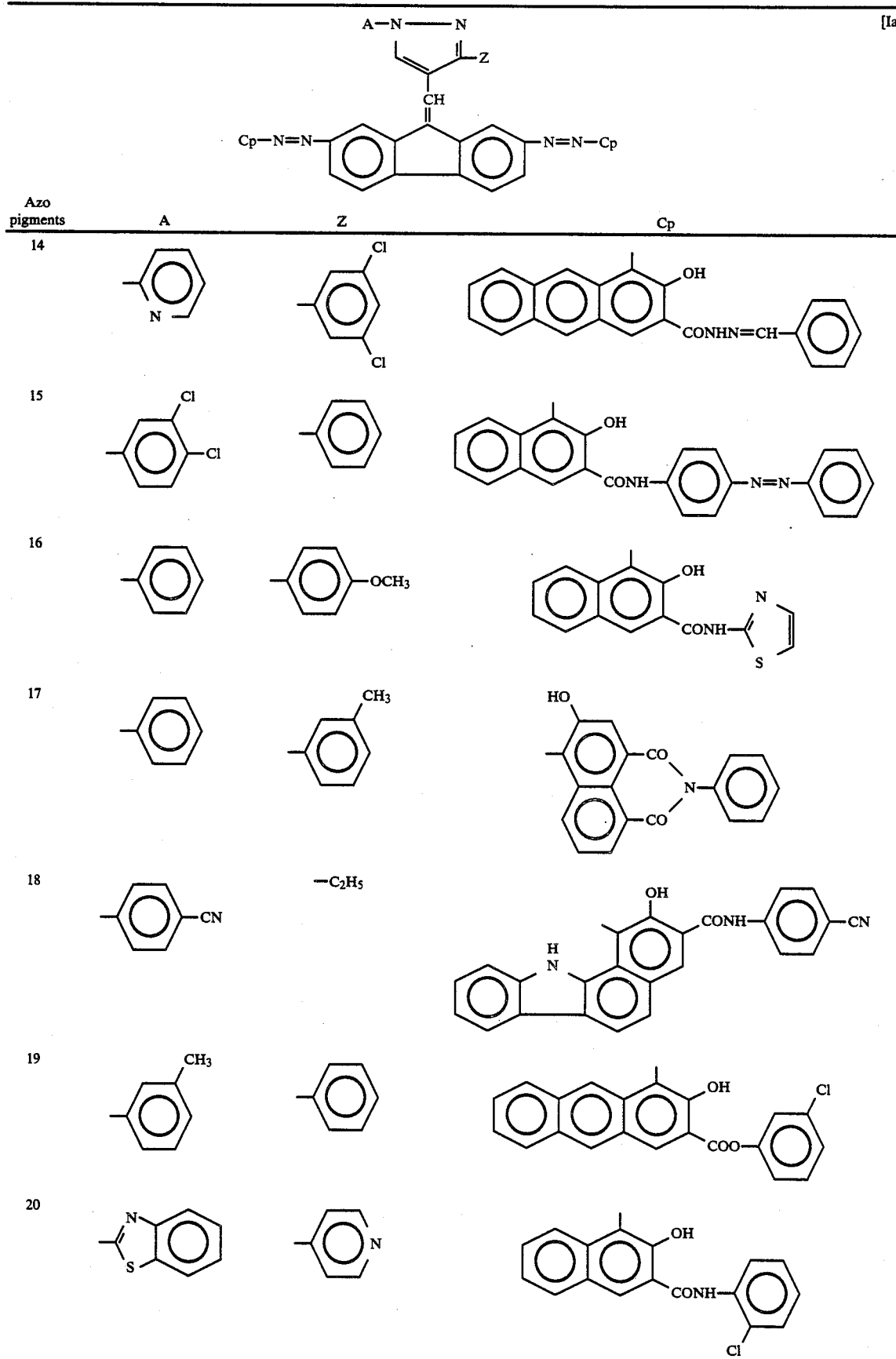

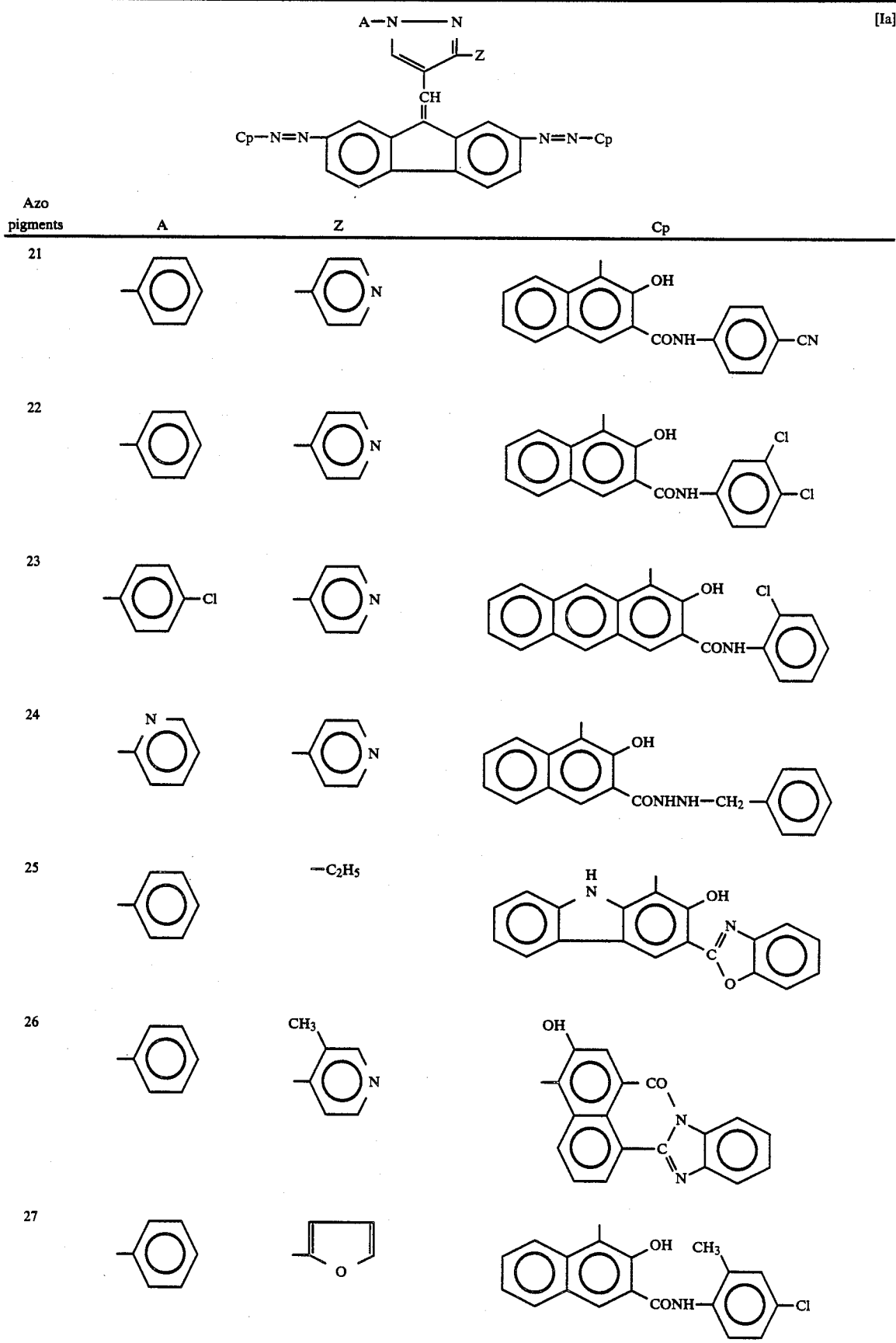

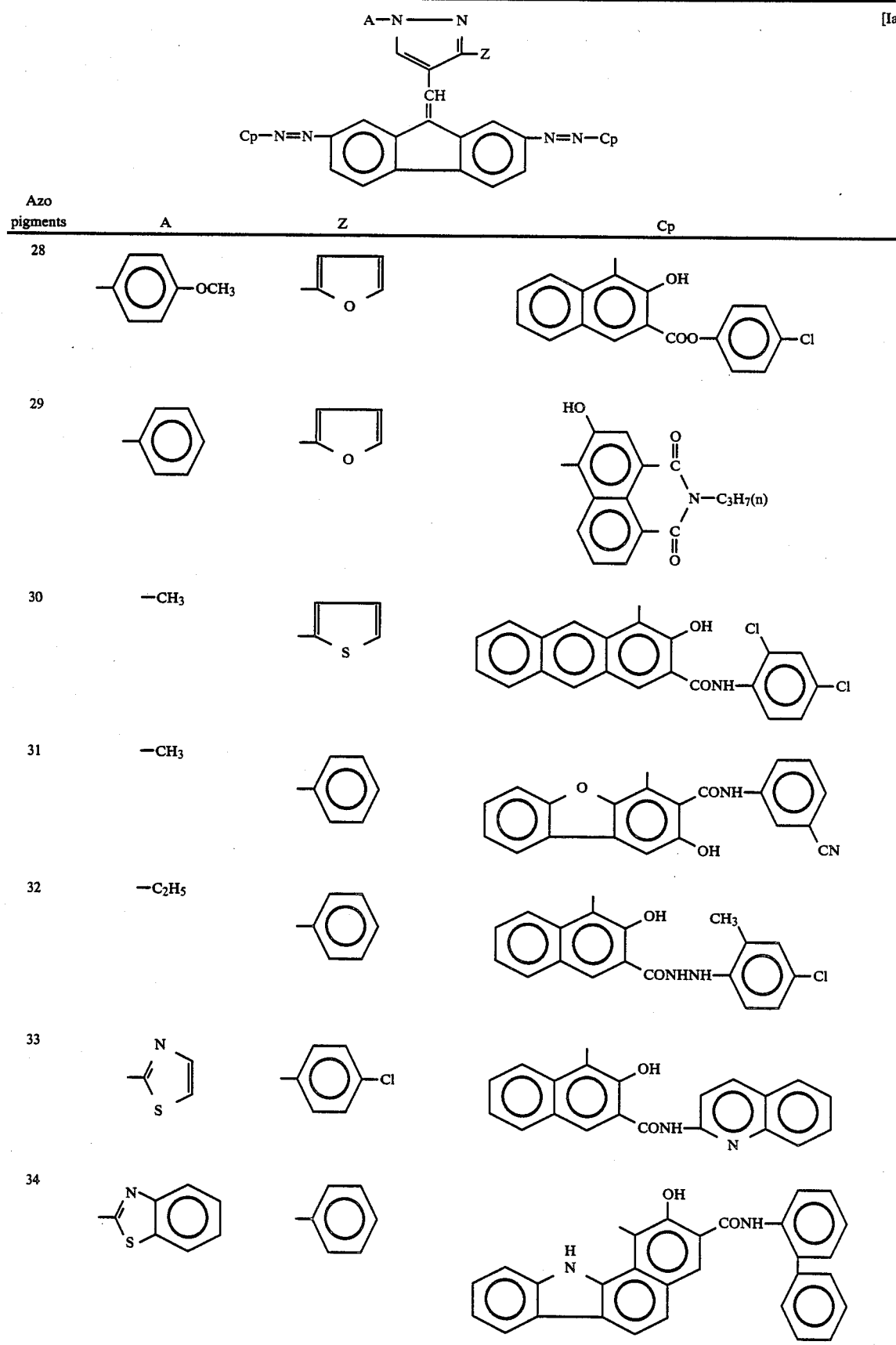

-continued
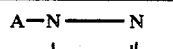
[Ia]
| Azo pigments | A | Z | Cp |
|---|---|---|---|
| 35 | 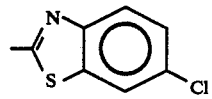 | —C$_2$H$_5$ | 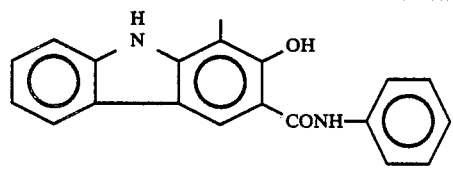 |
| 36 | 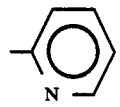 | 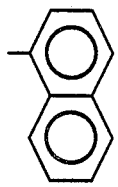 | 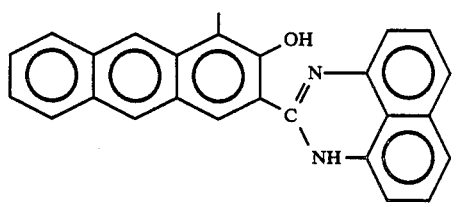 |
| 37 | 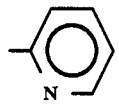 | 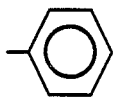 | 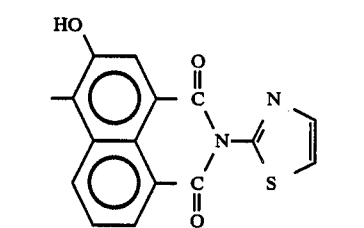 |
| 38 | 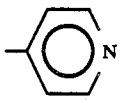 | —C$_2$H$_5$ | |
[Ib]
| Azo pigments | A | Z | Cp |
|---|---|---|---|
| 39 | 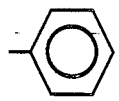 | —C$_2$H$_5$ | 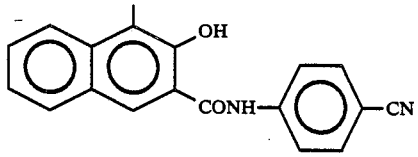 |

-continued
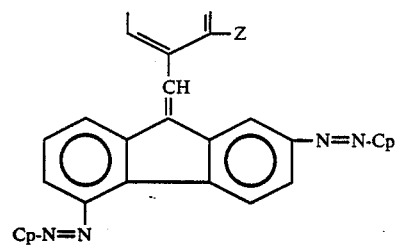
(Ib)
| Azo pigments | A | Z | Cp |
|---|---|---|---|
| 40 | 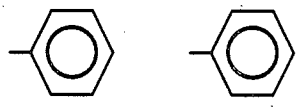 | 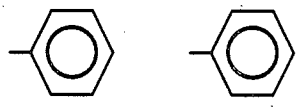 | " |
| 41 | 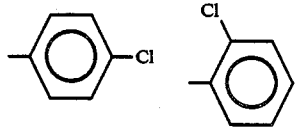 | 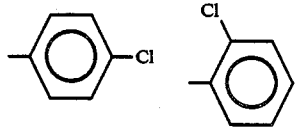 | " |
| 42 | 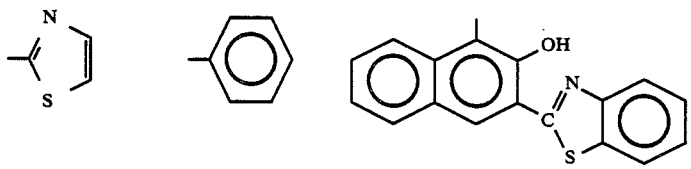 | | |
| 43 | 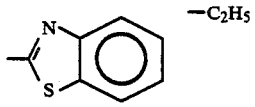 | $-C_2H_5$ | " |
| 44 | 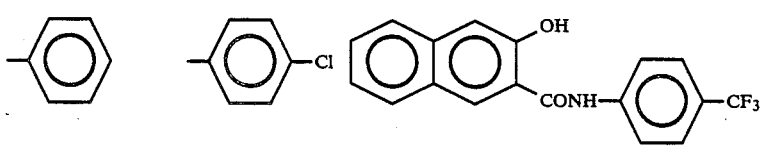 | | |
| 45 | 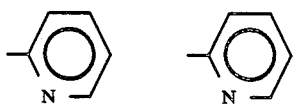 | 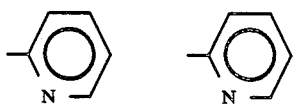 | " |
| 46 | 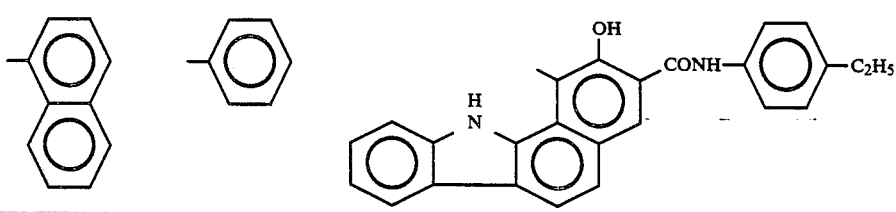 | | |

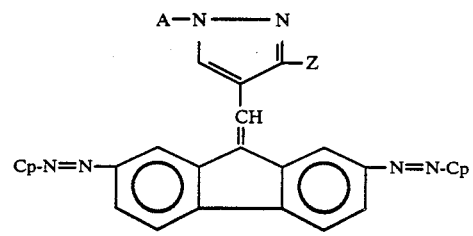
(Ic)
| Azo pigments | A | Z | Cp |
|---|---|---|---|
| 47 | —CH₃ | 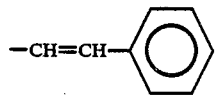 | 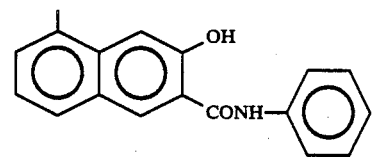 |
| 48 | —CH₃ | 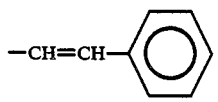 | 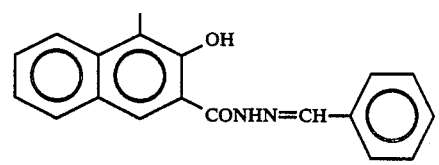 |
| 49 | —CH₃ | 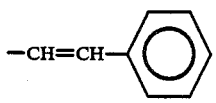 | 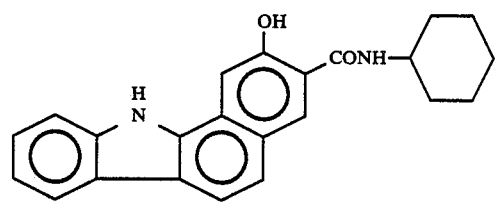 |
| 50 | —CH₃ | 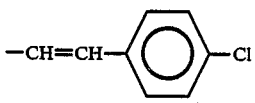 | 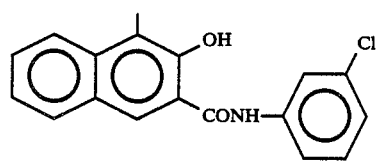 |
| 51 | —CH₃ | 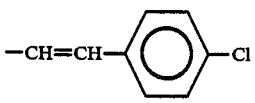 | 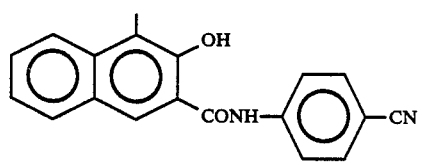 |
| 52 | —CH₃ | 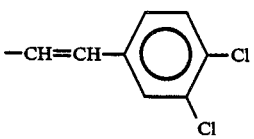 | 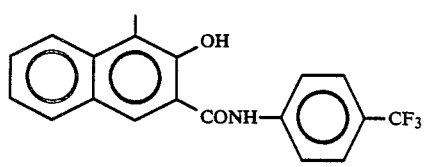 |
| 53 | —CH₃ | 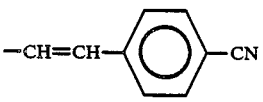 | 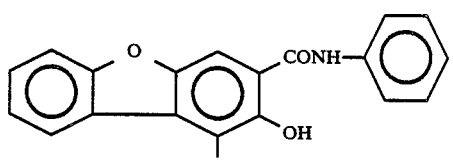 |

-continued
(Ic)
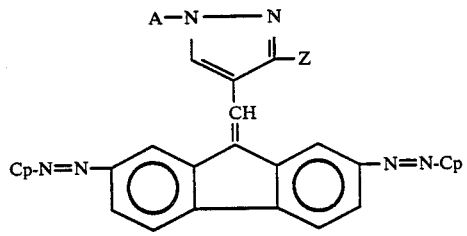
| Azo pigments | A | Z | Cp |
|---|---|---|---|
| 54 | —CH$_3$ | 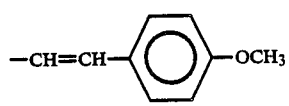 | 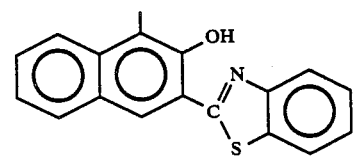 |
| 55 | —CH$_3$ | 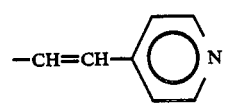 | 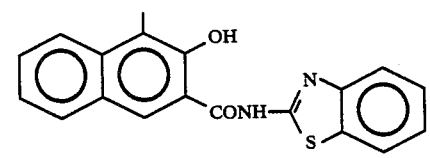 |
| 56 | —CH$_3$ | 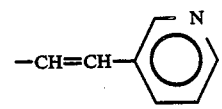 | 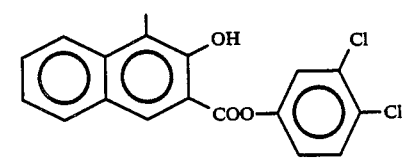 |
| 57 | —CH$_3$ | 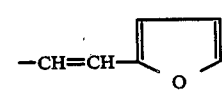 | 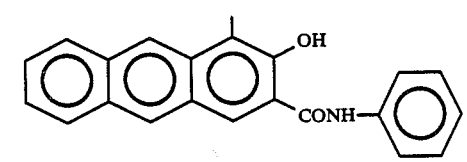 |
| 58 | —CH$_3$ | 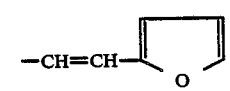 | 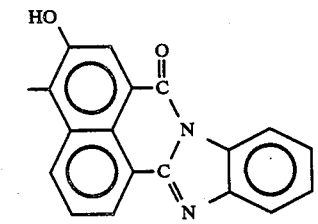 |
| 59 | —CH$_3$ | 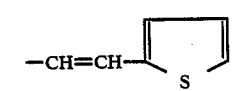 | 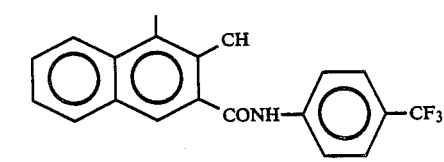 |
| 60 | —CH$_3$ | 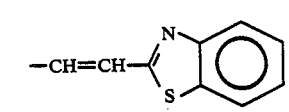 | 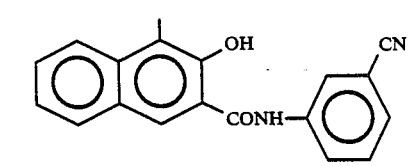 |

-continued
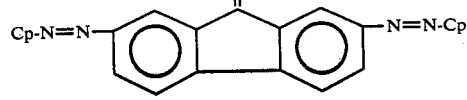
(Ic)
| Azo pigments | A | Z | Cp |
|---|---|---|---|
| 61 | —CH$_3$ | —CH=CH—C$_2$H$_5$ | 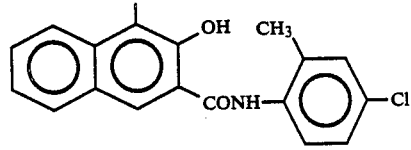 |
| 62 | —C$_2$H$_5$ | —CH=CH—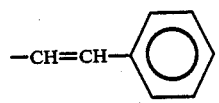 | 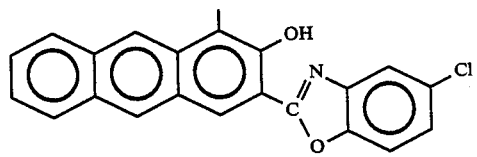 |
| 63 | 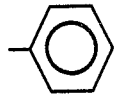 | —CH=CH—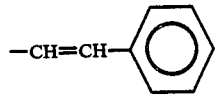 | 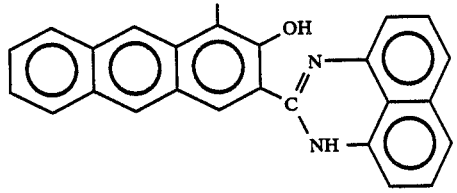 |
| 64 | 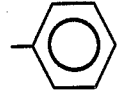 | —CH=CH—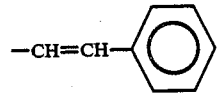 | 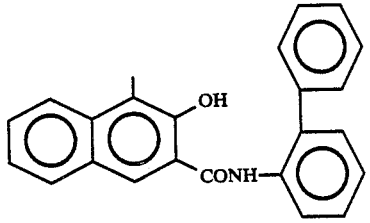 |
| 65 | 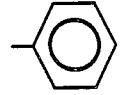 | —CH=CH—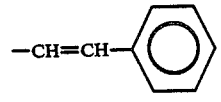 | 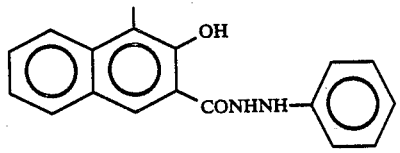 |
| 66 |  | —CH=CH—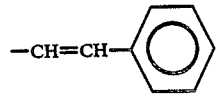 | 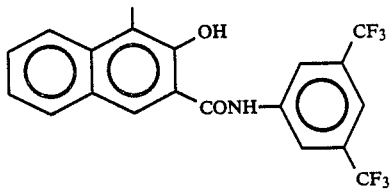 |
| 67 | 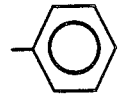 | —CH=CH—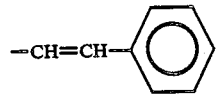 | 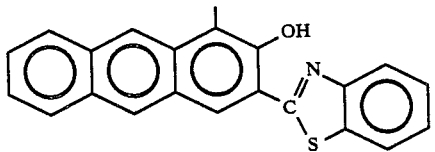 |

-continued
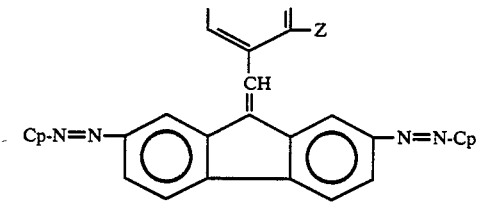
(Ic)
| Azo pigments | A | Z | Cp |
|---|---|---|---|
| 68 | 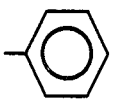 | 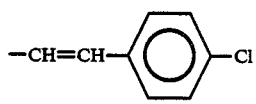 | 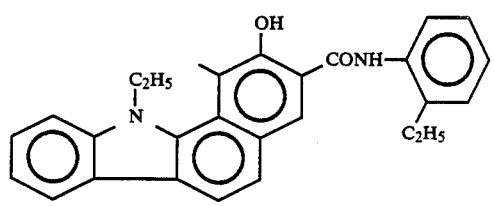 |
| 69 | 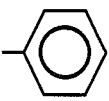 | 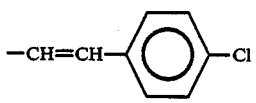 | 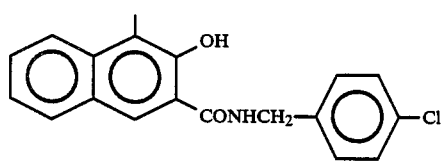 |
| 70 | 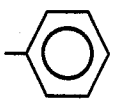 | 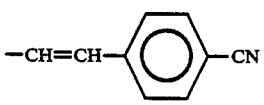 | 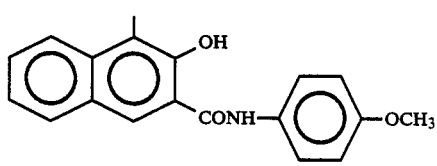 |
| 71 | 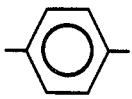 | 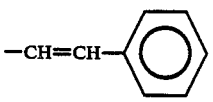 | 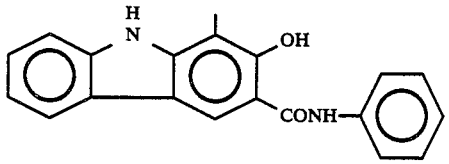 |
| 72 | 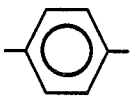 | 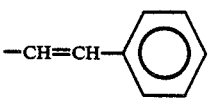 | 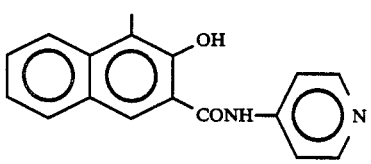 |
| 73 | 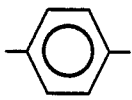 | 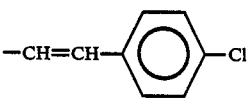 | 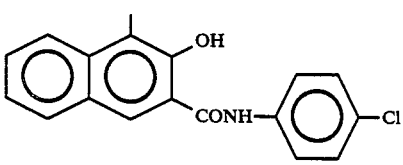 |
| 74 | 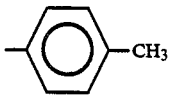 | 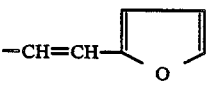 | 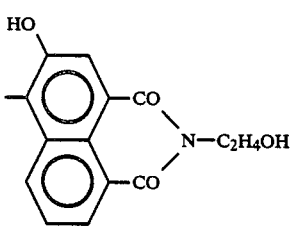 |

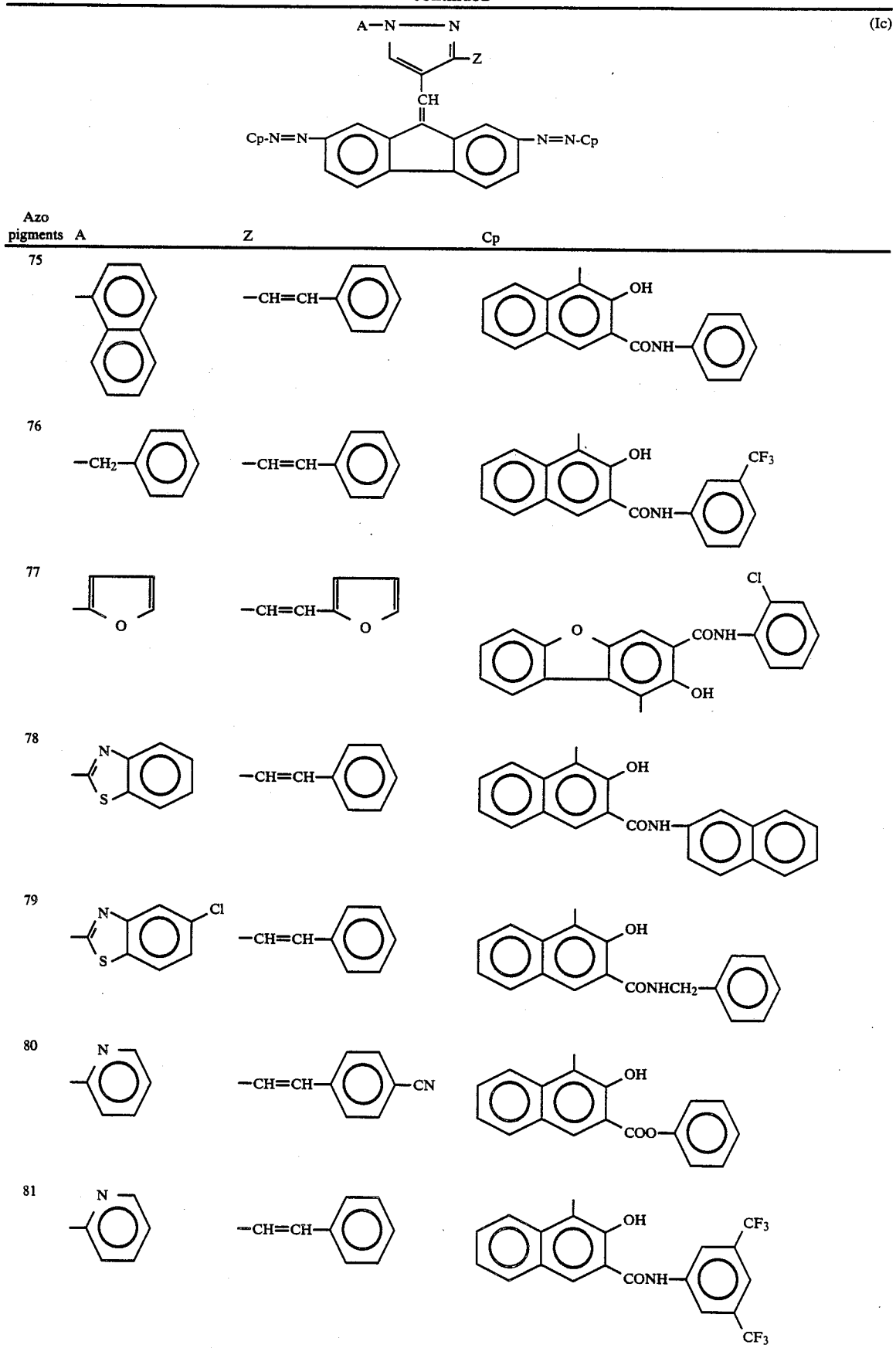

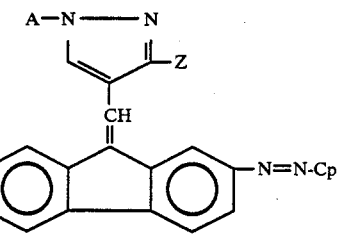
(Ic)
| Azo pigments | A | Z | Cp |
|---|---|---|---|
| 82 | 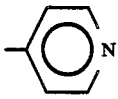 | 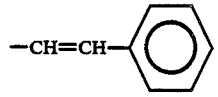 | 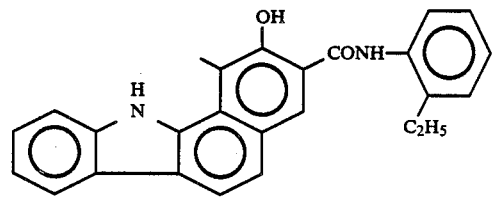 |
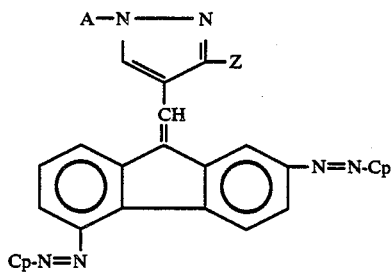
(Id)
| Azo pigments | A | Z | Cp |
|---|---|---|---|
| 83 | —CH$_3$ | 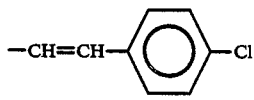 | 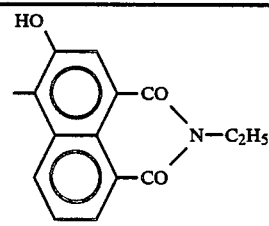 |
| 84 | 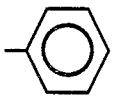 | 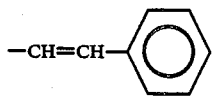 | 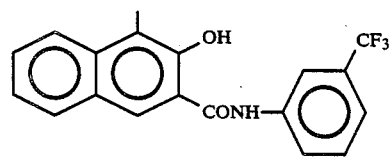 |
| 85 | 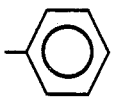 | —CH=CH—C$_2$H$_5$ | 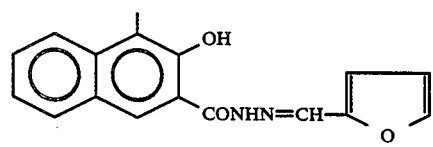 |
| 86 | 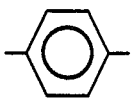 | 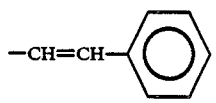 | 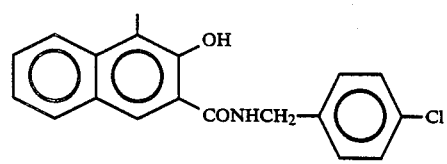 |

-continued
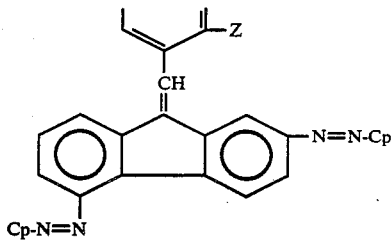 (Id)
| Azo pigments | A | Z | Cp |
|---|---|---|---|
| 87 | 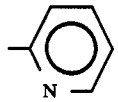 | 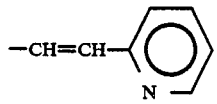 | 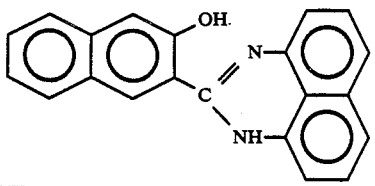 |
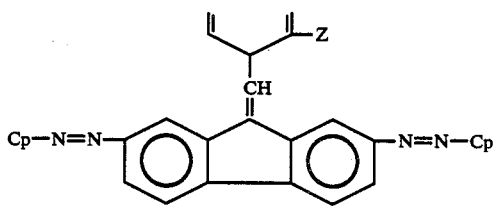 (Ia)
| Azo pigments | A | Z | Cp |
|---|---|---|---|
| 88 | 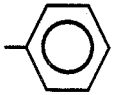 | H | 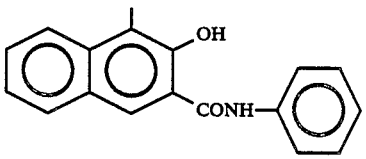 |
| 89 | 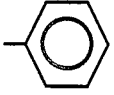 | H | 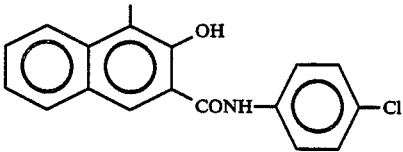 |
| 90 | 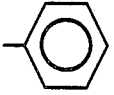 | H | 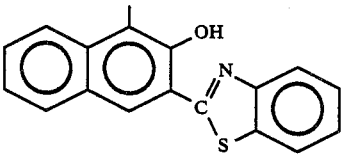 |
| 91 | 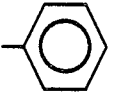 | " | 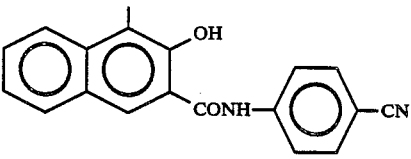 |

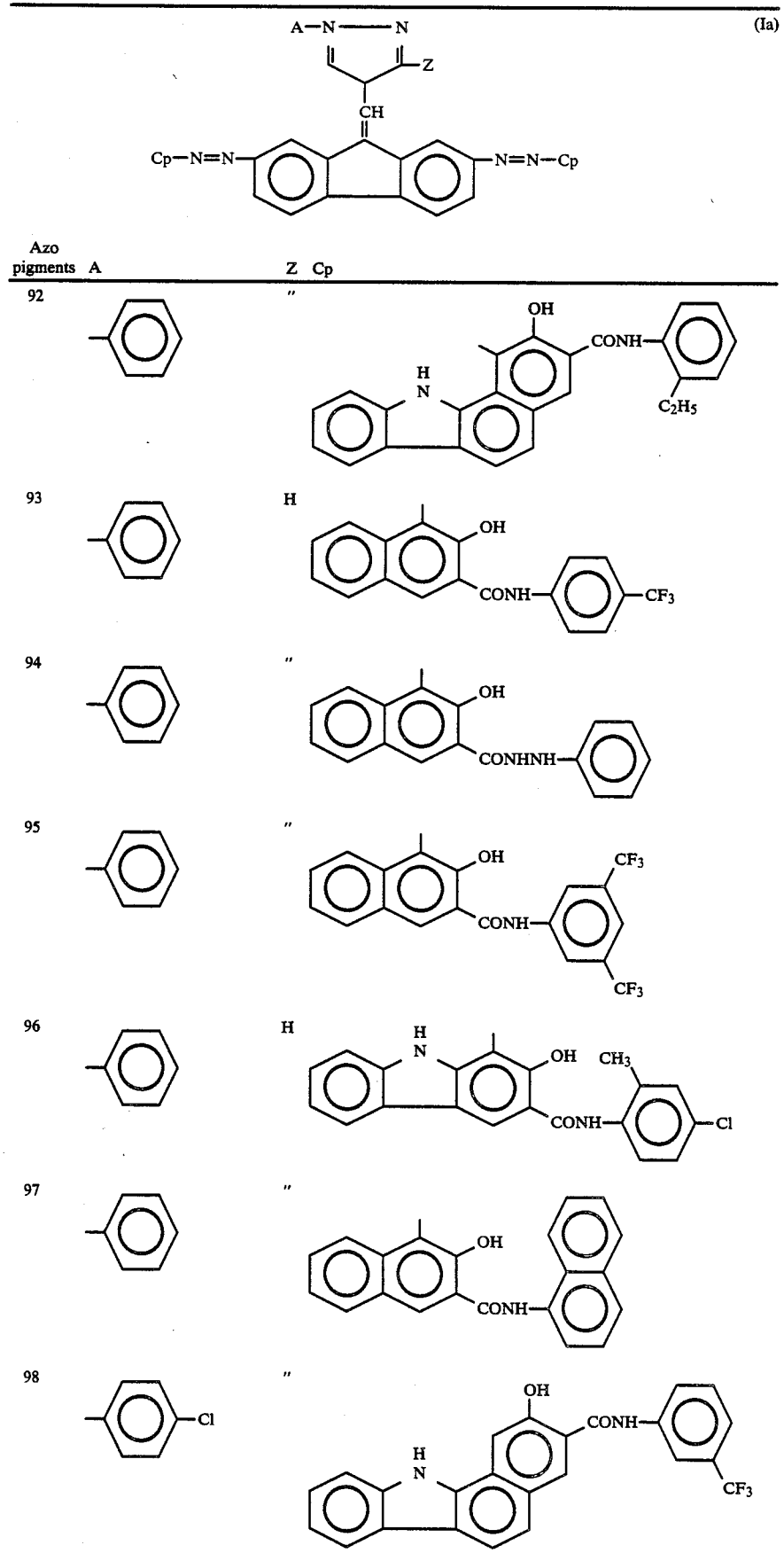

-continued
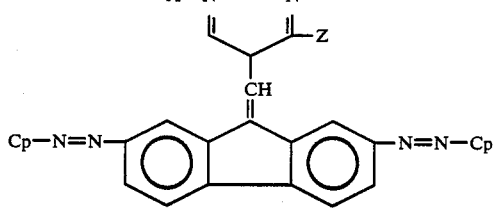 (Ia)
| Azo pigments | A | Z | Cp |
|---|---|---|---|
| 99 | 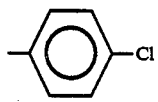 | H | 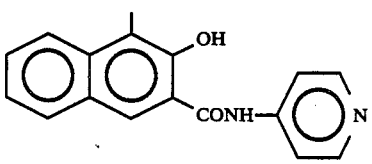 |
| 100 | 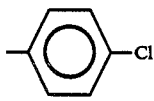 | " | 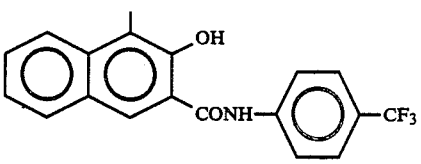 |
| 101 | 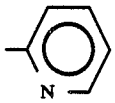 | " | 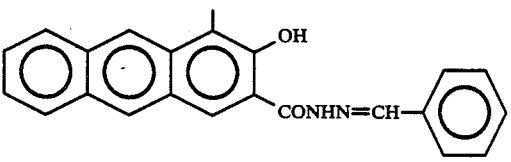 |
| 102 | 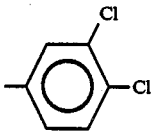 | H | 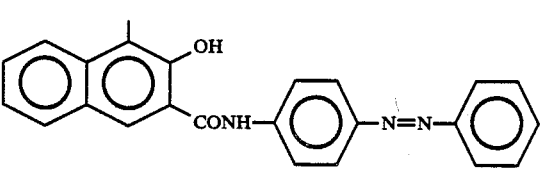 |
| 103 | 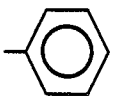 | " | 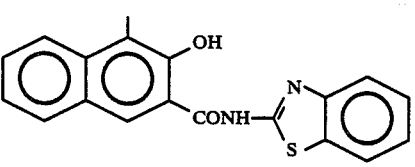 |
| 104 | 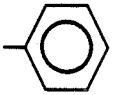 | " | 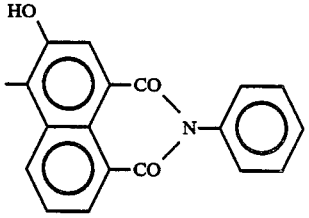 |
| 105 | 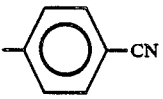 | H | 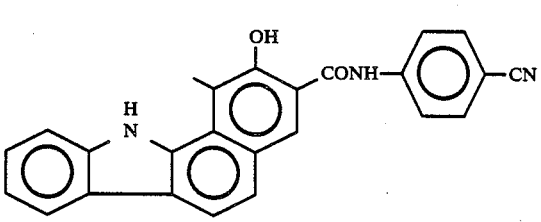 |

-continued
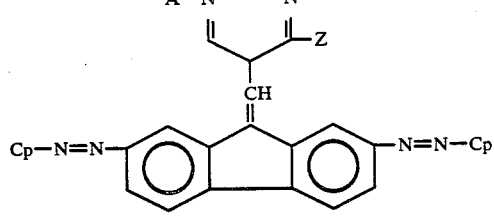
| Azo pigments | A | Z | Cp |
|---|---|---|---|
| 106 | 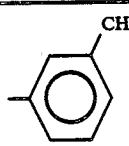 | " | 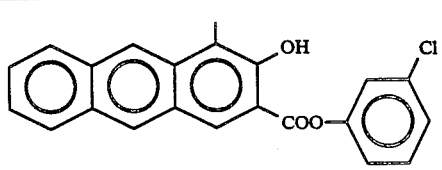 |
| 107 | 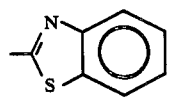 | " | 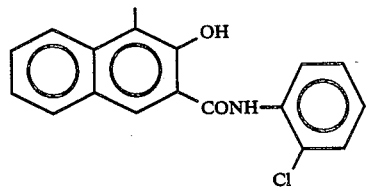 |
| 108 | 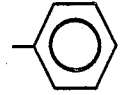 | H | 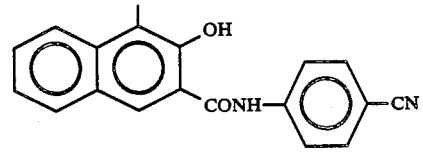 |
| 109 |  | " | 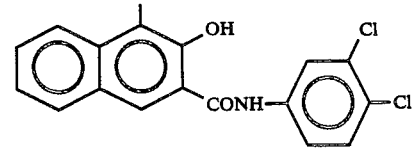 |
| 110 | 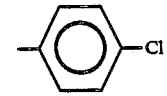 | " | 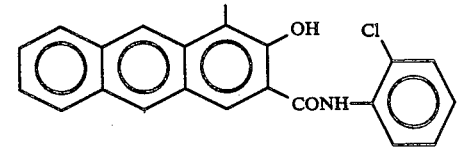 |
| 111 | 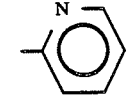 | " | 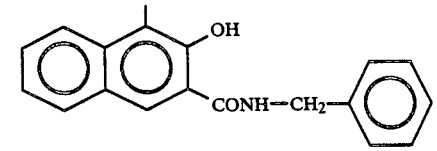 |
| 112 | 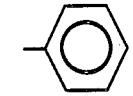 | " | 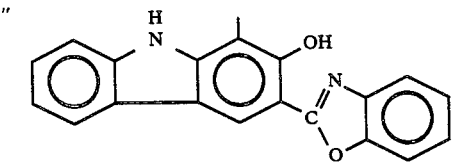 |

-continued
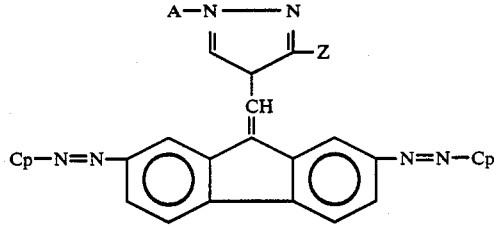
(Ia)
| Azo pigments | A | Z | Cp |
|---|---|---|---|
| 113 | 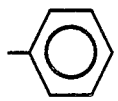 | " | 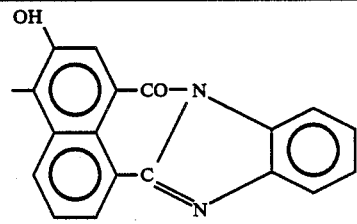 |
| 114 | 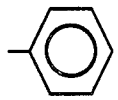 | H | 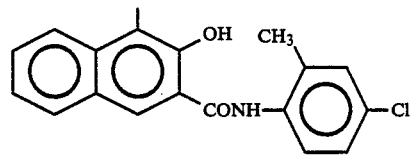 |
| 115 | 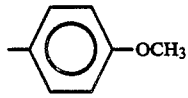 | " | 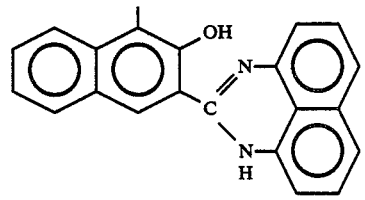 |
| 116 | 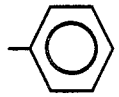 | " | 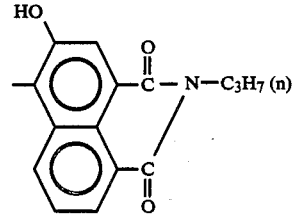 |
| 117 | —CH$_3$ | H | 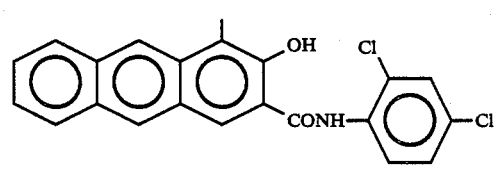 |
| 118 | —CH$_3$ | " | 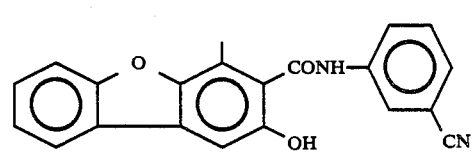 |
| 119 | —C$_2$H$_5$ | " | 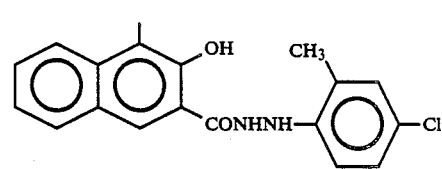 |

-continued
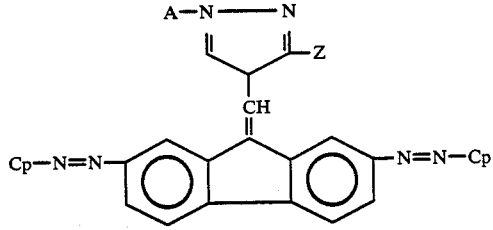
(Ia)
| Azo pigments | A | Z | Cp |
|---|---|---|---|
| 120 |  | H | 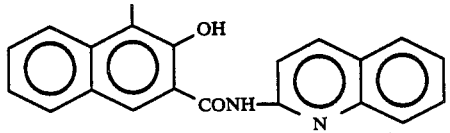 |
| 121 | 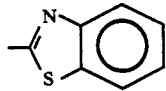 | " | 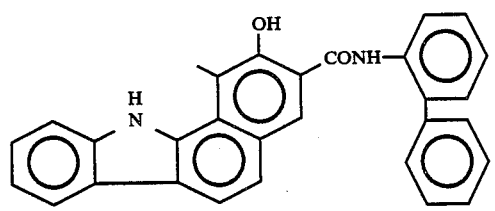 |
| 122 | 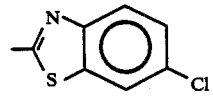 | " | 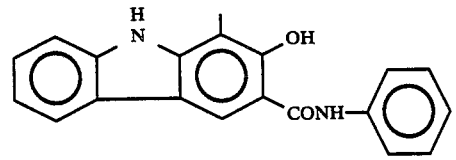 |
| 123 | 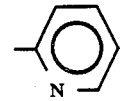 | H | 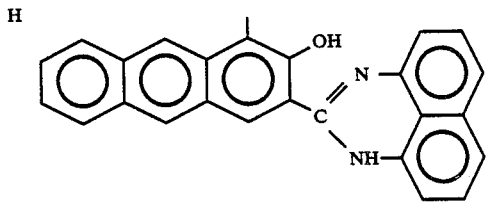 |
| 124 | 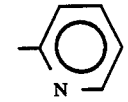 | " | 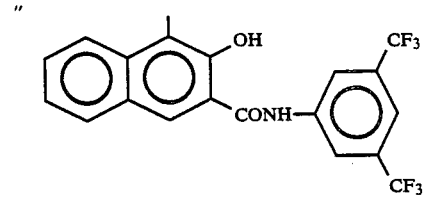 |
| 125 | 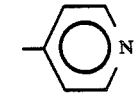 | " | 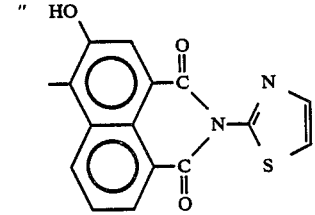 |

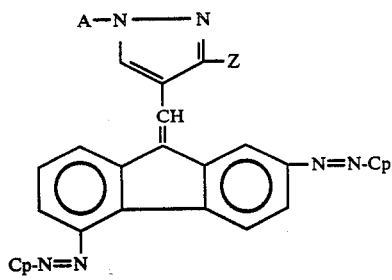
| Azo pigments | A | Z | Cp |
|---|---|---|---|
| 126 | 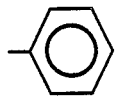 | H | 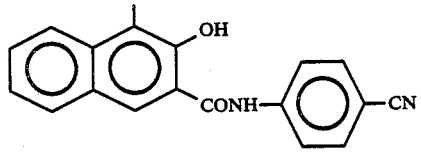 |
| 127 | 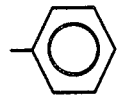 | " | 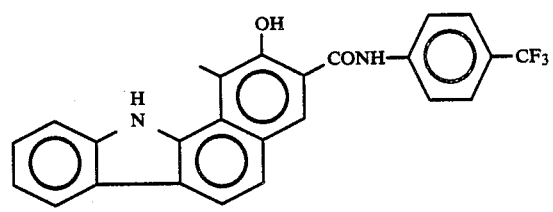 |
| 128 | 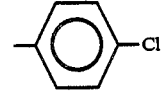 | H | 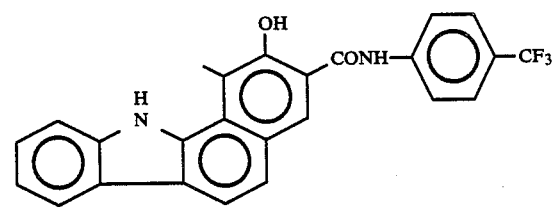 |
| 129 | 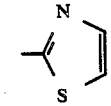 | " | 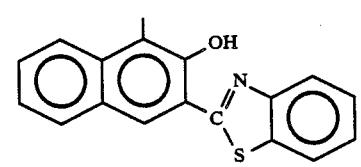 |
| 130 | 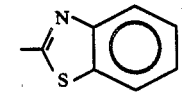 | " " | |
| 131 | 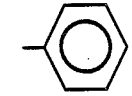 | H | 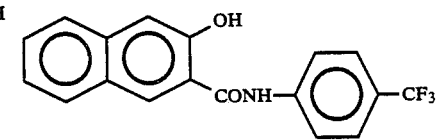 |
| 132 | 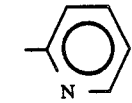 | " " | |

-continued

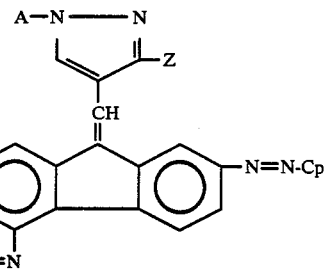

| Azo pigments | A | Z | Cp |
|---|---|---|---|
| 133 | 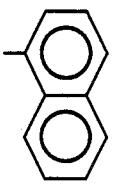 | " | 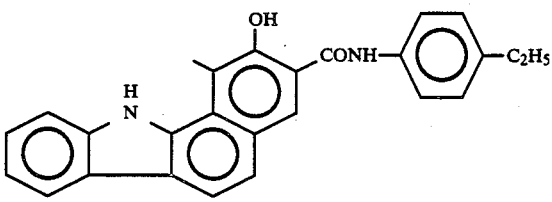 |

The azo pigment represented by the formula [I] can be easily synthesized by azotizing a divalent amino compound represented by the following formula by conventional method, then coupling with a corresponding coupler in the presence of an alkali or, alternatively, isolating the diazonium salt of the above divalent amino compound in the form of borofluoride salt or zinc chloride double salt and coupling with a coupler in the presence of an organic or inorganic alkali in a suitable solvent such as N,N-dimethylformamide, dimethylsulfoxide, ethanol or dioxane.

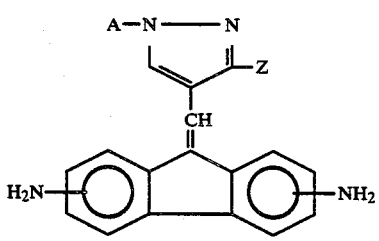

(A and Z are as defined hereinbefore)

The synthesis of typical examples of azo pigments used in this invention is described below.

SYNTHESIS EXAMPLE 1

(Azo pigment No. 1 exemplified herebefore)

(1-1) Acetophenone and phenylhydrazine in equal mole were reacted in ethanol in the presence of a slight amount of glacial acetic acid to obtain acetophenone-phenylhydrazone. From this hydrazone, a pyrazole compound represented by the following formula was obtained using phosphorus oxychloride and dimethylformamide.

(Recrystallization solvent: ethanol)

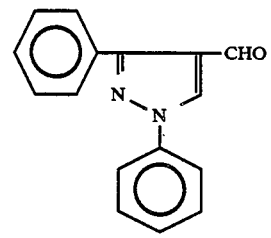

(Melting point: 149.5°–151.0° C.)

(1-2) The resulting aldehyde derivative of pyrazole and 2,7-dinitrofluorene were reflaxed with heating in n-butyl alcohol with addition of a small amount of piperidine. Precipitated product having orange color upon heating was collected by filtration and well washed with methanol and washed with hot acetone to obtain nearly quantitatively a nitro compound represented by the following formula.

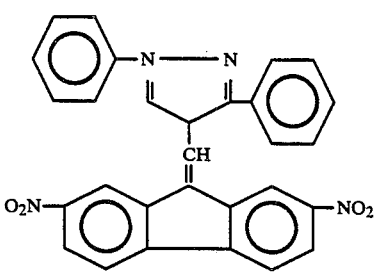

(Melting point: 315.5°–317.0° C.)

(1-3) The resulting dinitro compound was reduced with glacial acetic acid and reduced iron to obtain a diamino compound having the above formula (melting point: 284.5°–286.0° C.) (Recrystallization solvent: isopropyl alcohol)

IR spectrum (KBr method) of this diamino compound is shown in FIG. 1.

(1-4) To a slurry solution of 0.94 g of the above diamino compound in 10 cc of 1N hydrochloric acid was added a solution prepared by dissolving 0.32 g of sodium nitrite in minimum amount of water under cooling with ice and reaction was allowed to proceed for about 2 hours.

Then, active carbon was added, followed by filtration to obtain a diazonium salt solution.

1.4 g of 2-hydroxy-3-naphthoic acid anilide as a coupling component was dissolved in 50 ml of dimethylformamide and then added thereto a solution prepared by dissolving 1.7 g of sodium acetate in a minimum amount of water and the mixture was cooled to 5°–10° C.

Then, the above diazonium salt solution was added dropwise to the above coupler solution and the resulting blackish blue pasty solution was returned to room temperature and stirred for 3 hours. The resulting precipitate was collected by filtration, well washed with dimethylformamide, then with hot water and finally with acetone and dried at 80° C. under reduced pressure to obtain 1.9 g of black powder having somewhat metallic luster. m.p.=343° C. (dec.).

SYNTHESIS EXAMPLE 2

(Azo compound No. 2)

This azo pigment was synthesized in the same manner as in Synthesis Example 1 using 2-hydroxy-3-naphthoic acid-(p-chloroanilide) (m.p.: 274°–276° C.) as the coupling component.

The resulting pigment was also black powder having metallic luster. m.p.=350° C. or higher.

SYNTHESIS EXAMPLE 3

(Azo pigment No. 4)

The azo compound was prepared in the same manner as in Synthesis Example 1 except that a 2-hydroxy-3-naphthoic acid-(p-cyanoanilide) (m.p.: 278°–283.5° C.) was used as the coupling component.

The resulting pigment was also black powder with metallic luster. m.p.=350° C. or higher.

SYNTHESIS EXAMPLE 4

(Azo pigment No. 6)

(2-1) p-Chloroacetophenone and phenylhydrazine in equal mole were reacted in ethanol in the presence of a slight amount of concentrated hydrochloric acid to obtain p-chloroacetophenone-phenylhydroazone. From this hydrazone, a pyrazole compound represented by the following formula was obtained using phosphorus oxychloride and dimethylformamide. (Recrystallization solvent: ethanol)

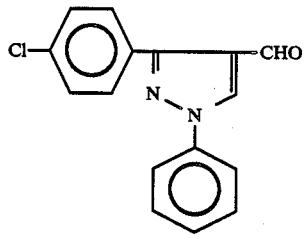

(Melting point: 146.5°–148.0° C.)

(2-2) The resulting aldehyde derivative of pyrazole and 2,7-dinitrofluorene were refluxed with heating in n-amyl alcohol with addition of a small amount of piperidine. Precipitated reddish brown slurry crystal was taken out and well washed with hot acetone to nearly quantitatively obtain a dinitro compound represented by the following structural formula.

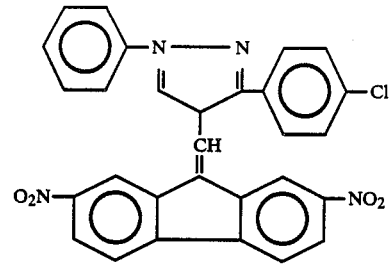

(Melting point: 316.5°–318° C.)

(2-3) The resulting dinitro compound was reduced with hydrochloric acid and tin to obtain a diamino compound having the above formula (melting point: 251°–253° C.). (Recrystallization solvent: ethanol)

Figure 2:
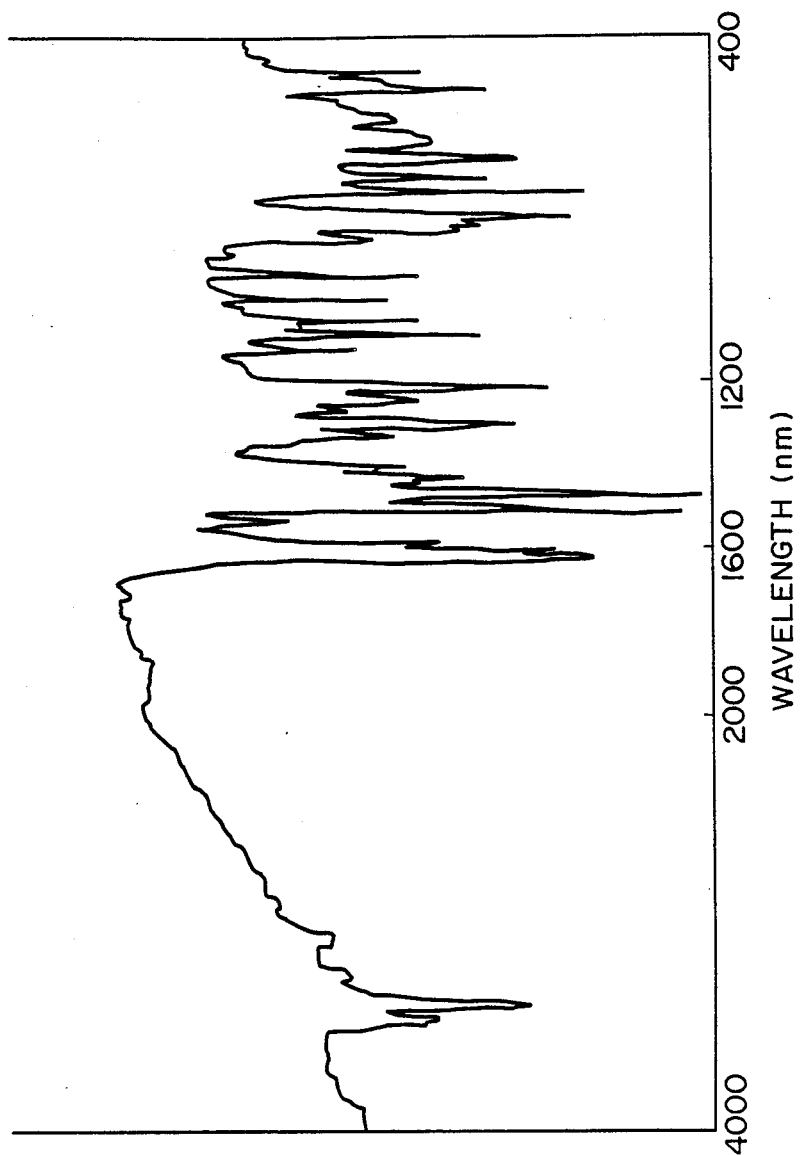
FIG. 2 is an IR spectrum of diamino compound in Synthesis Example 4.

IR spectrum (KBr method) of this diamino compound is shown in FIG. 2.

(2-4) To a slurry solution of 0.92 g of the above diamino compound in 10 cc of 1N hydrochloric acid was added a solution prepared by dissolving 0.35 g of sodium nitrite in a minimum amount of water under cooling with ice and reaction was allowed to proceed for about 2 hours. After removal of insoluble matters, about 2.0 g of borofluoric acid was added to the solution to precipitate reddish brown crystal. This was taken out, well washed with water and dissolved in DMF to obtain a diazonium salt.

Then, active carbon was added, followed by filtration to obtain a diazonium salt solution.

1.6 g of 2-hydroxy-3-naphthoic acid-(p-trifluoromethylanilide) (m.p.: 287.5°–290° C.) as a coupling component was dissolved in 50 ml of dimethylformamide and then thereto was added 1.2 g of pyridine. The coupler solution was cooled to 5°–10° C.

Then, to this solution was added dropwise the above diazonium salt solution in a short time and the resulting blackish blue pasty solution was returned to room temperature and stirred for 3 hours. The precipitated bisazo pigment was purified in the same manner as in Synthesis Example 1 to obtain 1.7 g of black powder with metallic luster. m.p.=350° C. or higher.

SYNTHESIS EXAMPLE 5

(Azo pigment No. 66)

(1-1) Benzalacetone and phenylhydrazine in equal mole were reacted in ethanol in the presence of a slight amount of glacial acetic acid to obtain benzalacetone-phenylhydroazone (m.p.: 161.5–163.0). From this hydrazone, a pyrazole compound represented by the following formula was obtained using phosphorus oxychloride and dimethylformamide. (Recrystallization solvent: ethanol)

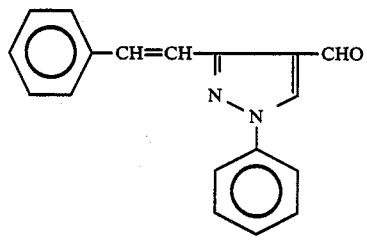

(Melting point: 129.5°–131.0° C.)

(1-2) The resulting aldehyde derivative of pyrazole and 2,7-dintrofluorene were refluxed with heating in n-butyl alcohol with addition of a small amount of piperidine. Precipitated product having orange color upon heating was collected by filtration and well washed with mechanol and washed with hot acetone to obtain nearly quantitatively a nitro compound represented by the following formula.

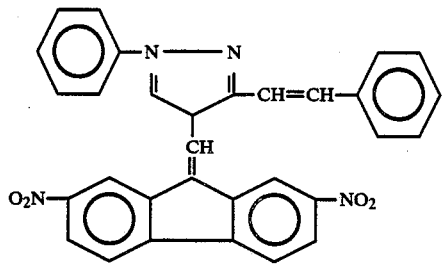

(Melting point: 298.5°–300° C.).

(1-3) The resulting dinitro compound was reduced with glacial acetic acid and reduced iron to obtain a diamino compound having the above formula (melting point: 308°–309.5° C.). Ethanol was used as a solvent for recrystallization.

Figure 4:
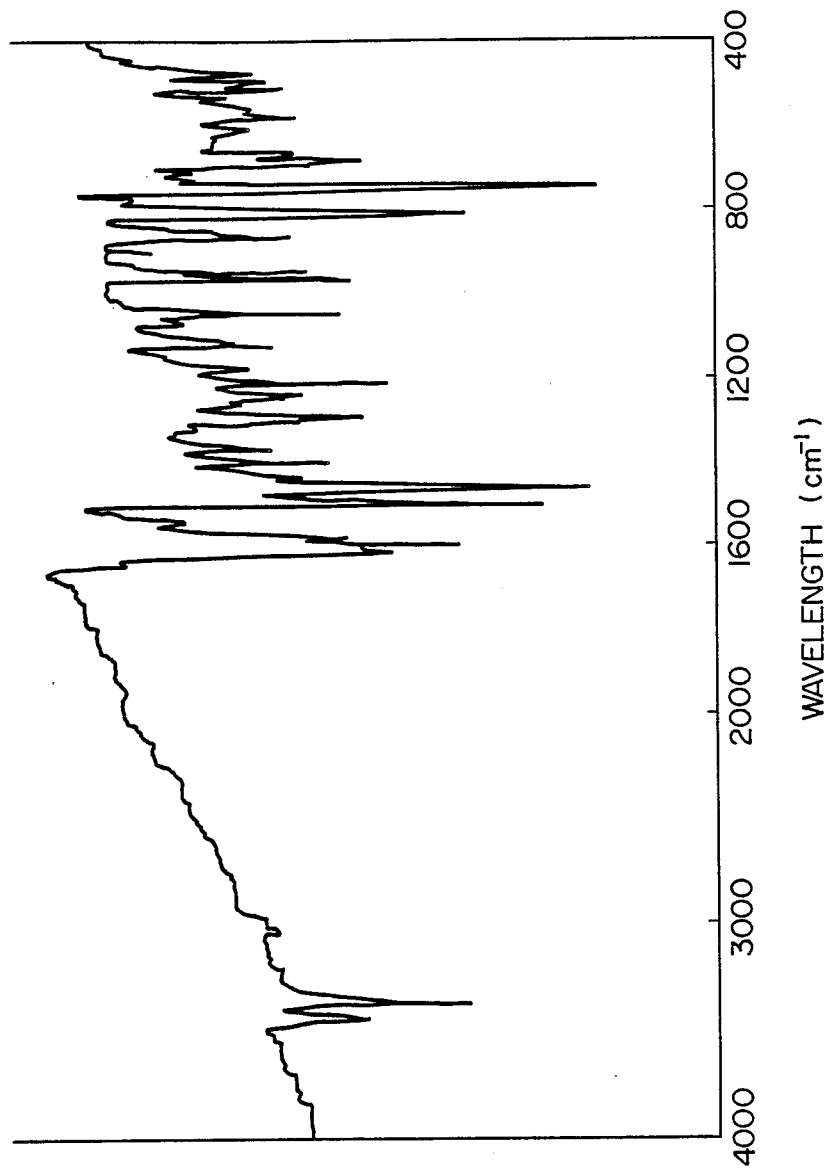
FIG. 4 is an IR spectrum of the amino compound in Synthesis Example 5.

IR spectrum (KBr method) of this diamino compound is shown in FIG. 4.

(1-4) To a slurry solution of 0.9 g of the above diamino compound in 10 cc of 1N hydrochloric acid was added a solution prepared by dissolving 0.32 g of sodium nitrite in a minimum amount of water under cooling with ice and reaction was allowed to proceed for about 2 hours.

Then, active carbon was added, followed by filtration to obtain a diazonium salt solution.

1.7 g of 2-hydroxy-N-[3,5-di($\alpha,\alpha,\alpha$-trifluoromethyl)-phenyl]-3-naphthoic acid amide (m.p.: 236.5°–239° C.) as a coupling component and 4.0 g of triethanolamine were dissolved in 100 ml of dimethylformamide and the solution was cooled to 0°–5° C.

Then, the above diazonium salt solution was added dropwise to the above coupler solution and the resulting blackish blue pasty solution was kept at 0°–10° C. and stirred for 3 hours. The resulting precipitate was collected by filtration, washed with acetone, then well washed with hot water and finally repeatedly washed with hot acetone and dried at 80° C. for about 5 hours to obtain 1.72 g of black powder having somewhat metallic luster having a decomposition temperature of 350° C. or higher.

SYNTHESIS EXAMPLE 6

(Azo pigment No. 98)

1-(4'-chlorophenyl)-4-carboaldehyde pyrazole and 2,7-dinitrofluorene in equal mole were heated and stirred in dioxane with addition of small amount of piperidine to obtain a dinitro compound represented by the following formula. m.p.: 280° C. or higher.

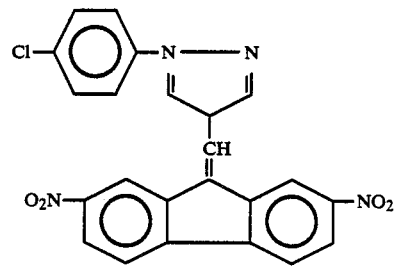

This dinitro compound was reduced with Fe powder and glacial acetic acid to obtaina reddish brown diamino compound. m.p.: 248°–249° C. From this diamino compound was obtained a diazonium salt using 2N hydrochloric acid and sodium nitrite.

This diazonium salt was reacted with a benzocarbazole ring-containing coupler by a given method to obtain blackish blue powder. This powder was well washed with water and then repeatedly washed with DMF and acetone to obtain a powder having somewhat metallic luster.

Other azo pigments of this invention can also be obtained in a manner similar to the above synthetic examples.

The electrophotographic photoreceptor of this invention has a photosensitive layer containing at least one azo pigments represented by the formula [I]. There are known various types of photosensitive layer. The photosensitive layer of the electrophotographic photoreceptor of this invention may be any of the known types, but is normally of the following types:

(1) A photosensitive layer comprising an azo pigment.

(2) A photosensitive layer comprising a dispersion of an azo pigment in a binder.

(3) A photosensitive layer comprising a dispersion of an azo pigment in a known charge transfer material.

(4) A photosensitive layer of a laminate type comprising the photosensitive layer (1), (2) or (3) as a charge generating layer and a charge transfer layer containing known charge transfer material.

The azo pigment represented by the above formulas generates in a high efficiency a charge carrier upon absorption of light. The generated carrier can be transferred through the medium of the azo pigment, but more desirably through the medium of a known charge transfer material. From such a viewpoint, the photosensitive layers of the types (3) and (4) are especially preferred.

The charge transfer materials are generally classified into two groups, the first group which transfer the charge by electron propagation and the second group which transfer the charge by hole propagation. Materials of both groups can be used in the photosensitive layer of the photoreceptor of this invention. Mixtures of those which have the same functions or of those which have different functions may be used.

The materials of the first group are electron attractive compounds having electron attractive groups such as nitro group, cyano group, ester group and the like. As examples thereof, mention may be made of nitrated fluorenones such as 2,4,7-trinitrofluorenone and 2,4,5,7-tetranitrofluorenone; tetracyanoquinodimethane, tetracyanoethylene, 2,4,5,7-tetranitroxanthone, 2,4,8-trinitrothioxanthone and polymers of these compounds.

The materials of the second group are electron donative, organic photoconductive compounds. Examples thereof are shown below:

Aromatic amine compounds

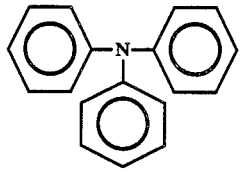
(1-1)

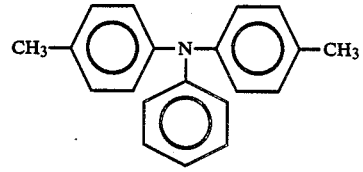
(1-2)

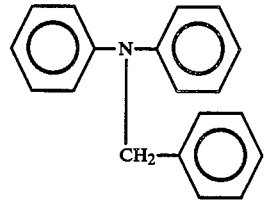
(1-3)

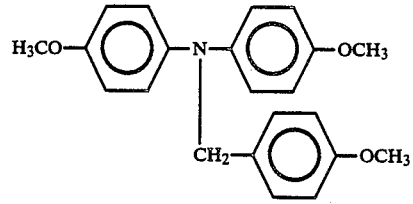
(1-4)

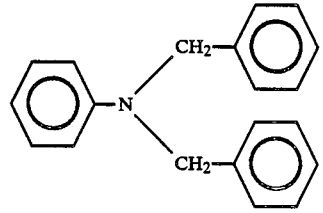
(1-5)

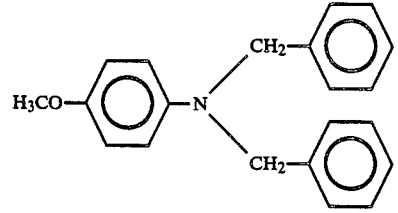
(1-6)

-continued
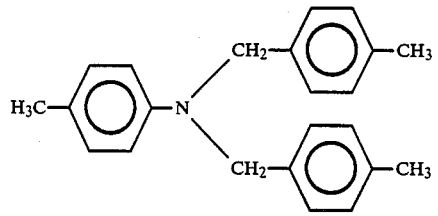
(1-7)
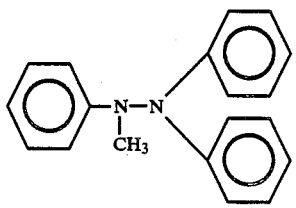
(1-8)
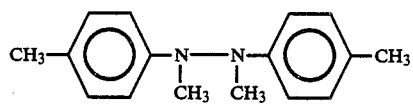
(1-9)
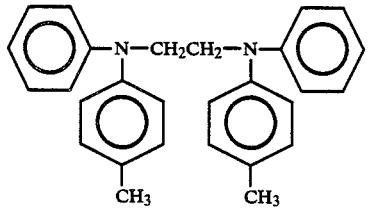
(1-10)
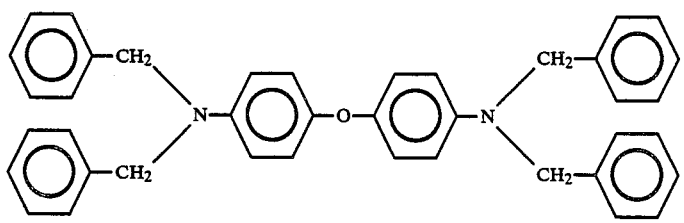
(1-11)
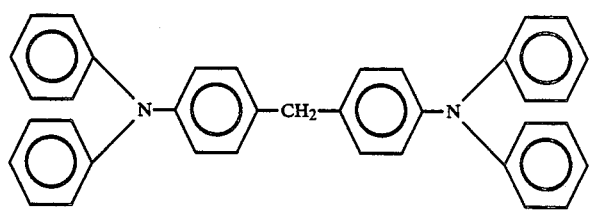
(1-12)
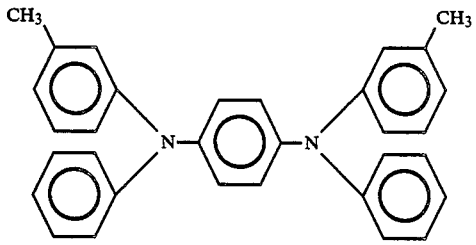
(1-13)

-continued
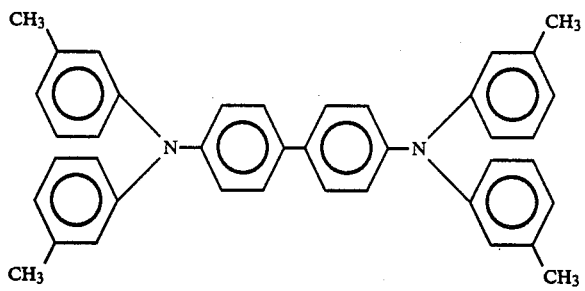 (1-14)
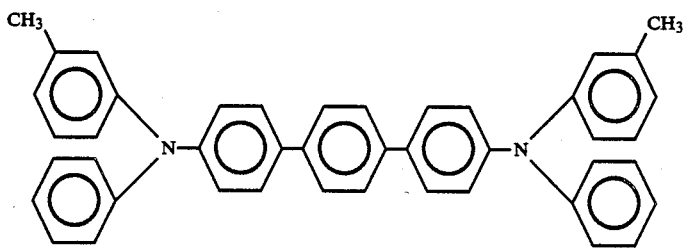 (1-15)
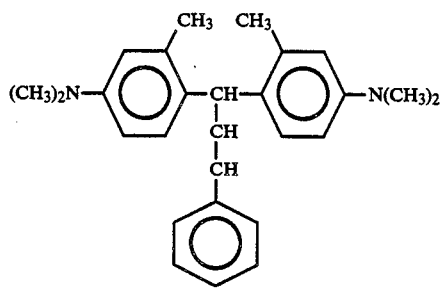 (1-16)
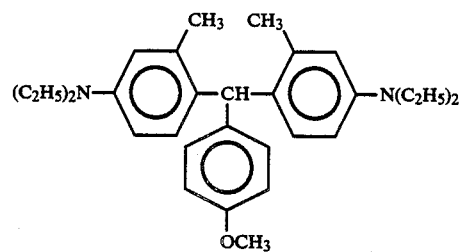 (1-17)
Hydrazone Compounds
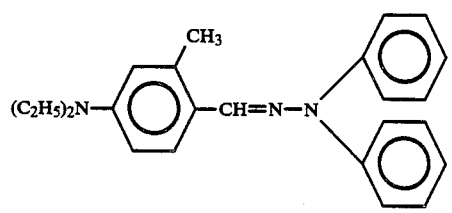 (2-1)
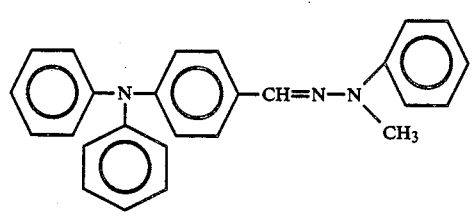 (2-2)

-continued
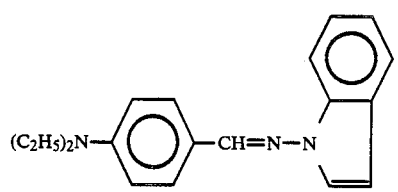
(2-3)
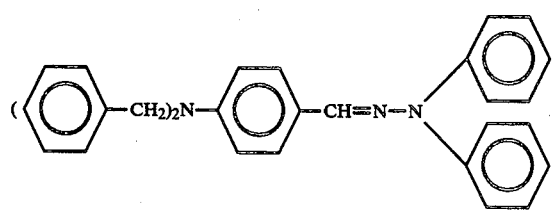
(2-4)
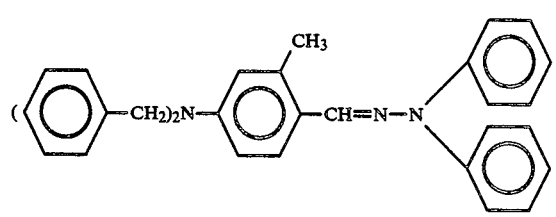
(2-5)
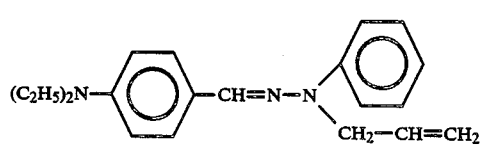
(2-6)
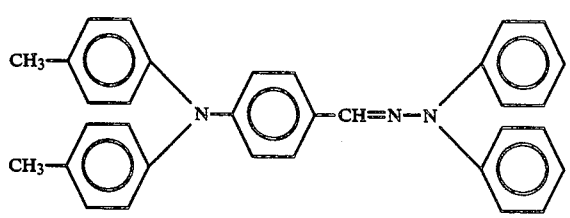
(2-7)
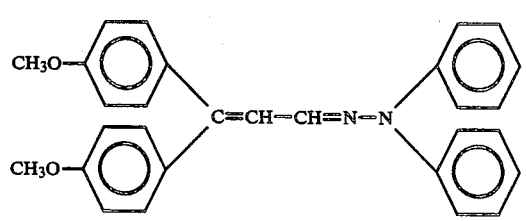
(2-8)
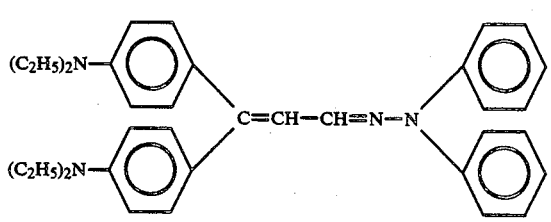
(2-9)

-continued
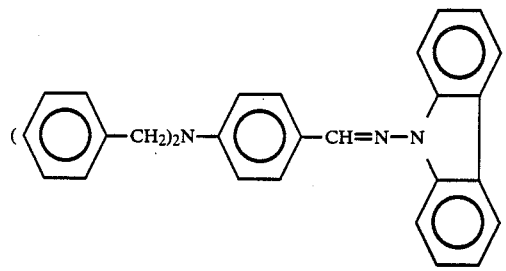 (2-10)
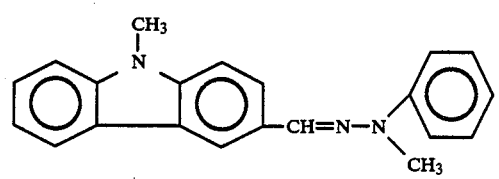 (2-11)
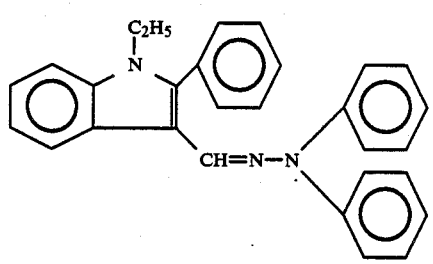 (2-12)
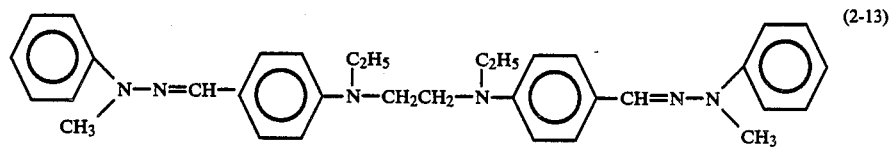 (2-13)
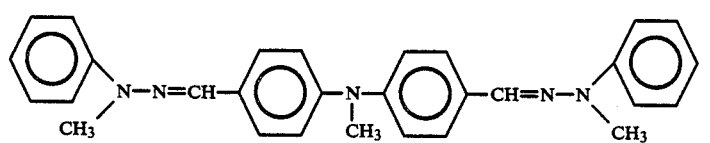 (2-14)
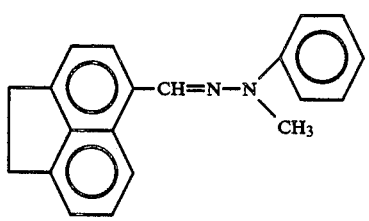 (2-15)
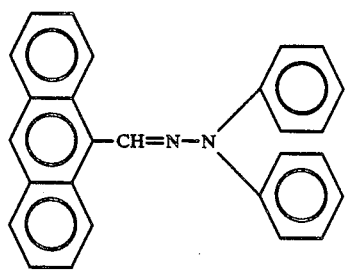 (2-16)
Heterocyclic compounds
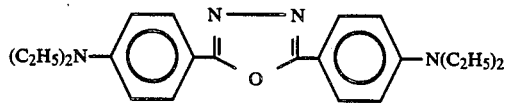 (3-1)

-continued
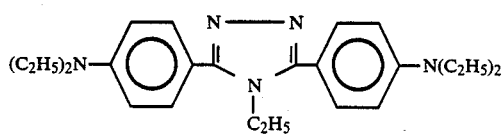 (3-2)
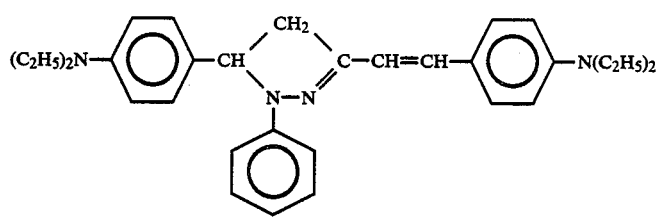 (3-3)
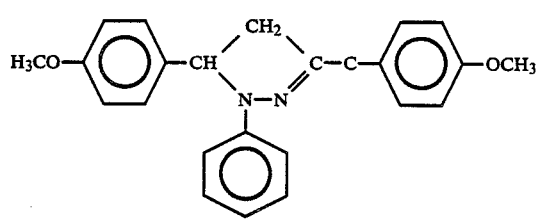 (3-4)
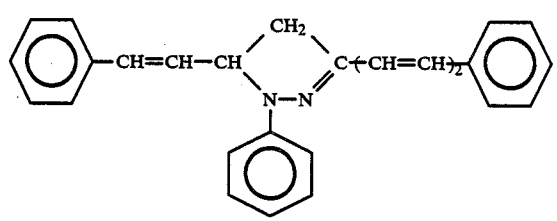 (3-5)
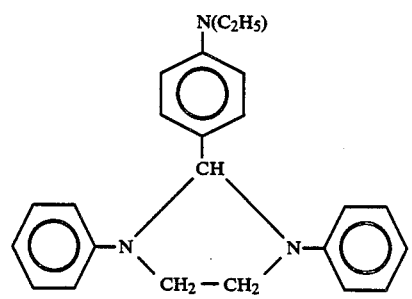 (3-6)
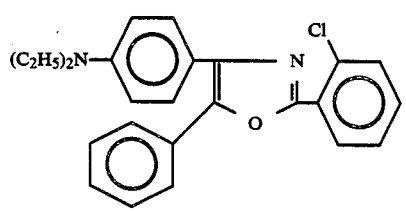 (3-7)
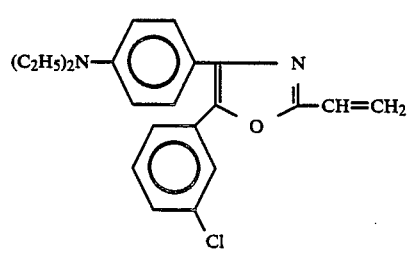 (3-8)

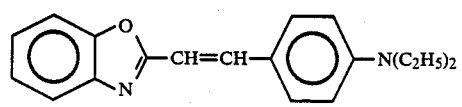
(3-9)
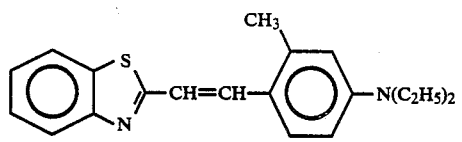
(3-10)
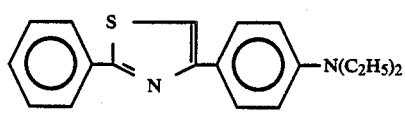
(3-11)
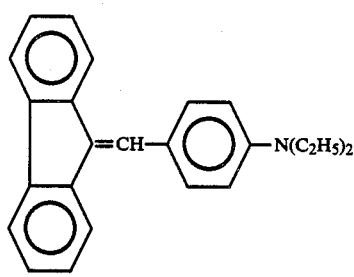
(3-12)
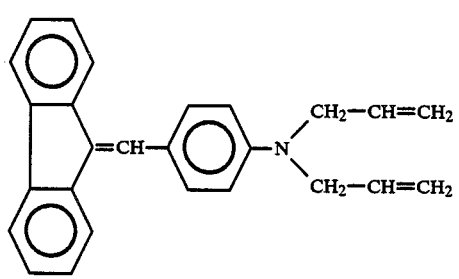
(3-13)
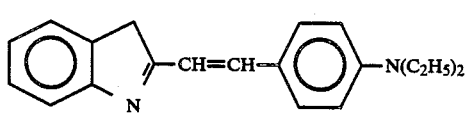
(3-14)
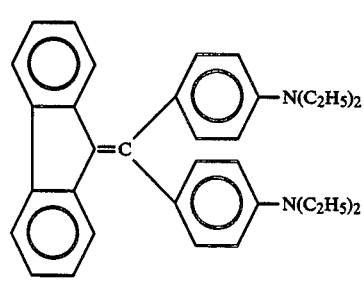
(3-15)
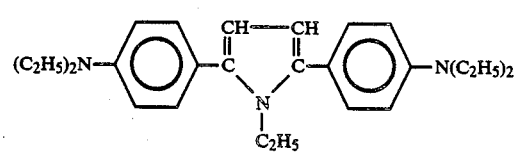
(3-16)

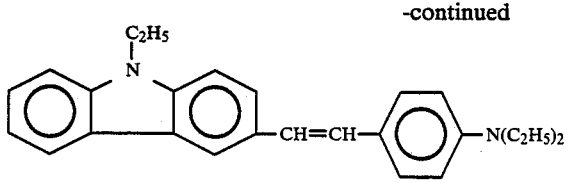 (3-17)

-continued

Further, there may also be used polymeric compounds such as poly-N-vinylcarbazole, halogenated poly-N-vinylcarbazole, polyvinylpyrene, polyvinylanthracene, polyvinylacridine, polyglycidylcarbazole, polyvinylacenaphthylene and ethylcarbazole fromaldehyde resin.

The carrier transfer materials are not limited to those mentioned here and may be used alone or in combination of two or more.

The electrophotographic photoreceptor of this invention can be prepared by conventional methods.

For example, the electrophotographic photoreceptor having the photosensitive layer of type (1) can be prepared by dissolving or dispersing the azo pigment represented by the formula [I] in a suitable medium and coating the resulting coating composition on an electroconductive support and drying the coat to form a photosensitive layer of normally 0.1-several ten μm thick.

As the medium for preparation of the coating composition, mention may be made of, for example, basic solvents which dissolves azo dyes such as n-butylamine and ethylenediamine and those which disperse azo pigments, for example, ethers such as tetrahydrofuran and 1,4-dioxane; ketones such as methyl ethyl ketone and cyclohexanone; aromatic hydrocarbons such as toluene and xylene; non-protonic polar solvents such as N,N-dimethylformamide, acetonitrile, N-methylpyrrolidone and dimethyl sulfoxide; alcohols such as methanol, ethanol and isopropanol; esters such as ethyl acetate, methyl acetate and methyl cellosolve acetate; and chlorinated hydrocarbons such as dichloroethane and chloroform.

In case of using media which disperse azo pigments, azo pigments must be pulverized to a particle size of 5 μm or less, preferably 3 μm or less and most suitably 1 μm or less.

As the electroconductive supports on which a photosensitive layer is formed, there may be any of those which are normally used for electrophotographic photoreceptors.

Specific examples thereof are metallic drums or sheets of, for example, aluminum and copper and laminates of these metal foils and sheets vapor-deposited with such metals.

Further examples of the supports are plastic films, plastic drums and papers made electroconductive by coating with electroconductive materials such as metallic powders, carbon black, copper iodide and polymeric electrolytes together with suitable binders. Furthermore, there may also be used plastic sheets or drums made conductive by containing conductive materials such as metallic powder, carbon black and carbon fibers.

The photoreceptor having a photosensitive layer of type (2) can be prepared by dissolving a binder in the coating composition used for formation of the photosensitive layer of type (1).

In this case, the medium of the coating composition is preferably one which dissolves binder.

As binders, mention may be made of, for example, polymers and copolymers of vinyl compounds such as styrene, vinyl acetate, acrylic esters and methacrylic esters and polymers such as phenoxy resins, polysulfones, arylate resins, polycarbonates, polyesters, cellulose esters, cellulose ethers, butyral resins, epoxy resins and acrylpolyol resins.

Amount of binder is usually 0.1-5 parts by weight for 1 part of azo pigment.

In making such a type of photosensitive layer, it is desirable to allow azo pigments to be present in the form of fine particles such as, for example, of 3 μm or less, expecially 1 μm or less in particle size in the binder.

Likewise, the photoreceptor having a photosensitive layer of type (3) can be prepared by dissolving a charge transfer medium in the coating composition used for preparation of the photosensitive layer of type (1). Any of the abovementioned charge transfer media can be used.

The charge transfer medium is used preferably together with a binder, except for polyvinylcarbazole and polyglycidylcarbazole which serve also as binders. Any of the binders mentioned above can be used.

The binder is used normally in an amount of 0.5-100 parts by weight for 1 part by weight of azo pigment. The charge transfer medium is used normally in an amount of 0.2-3.0, preferably 0.3-1.2 parts by weight for 1 part by weight of azo pigment. The charge transfer medium which serves also as a binder is normally used in an amount of 1-10 parts by weight for 1 part by weight of azo pigment.

Like the photosensitive layer of type (3), in the photosensitive layer of this type, azo pigment is preferably present in the form of fine particles in the charge transfer medium and the binder.

The photoreceptors having a photosensitive layer of type (4) can be prepared by coating a coating composition prepared by dissolving a charge transfer medium in a suitable medium on the photosensitive layer of type (1), (2) or (3) and drying the coat, resulting in a charge transfer layer on the photosensitive layer.

In this case, the photosensitive layers of types (1), (2) and (3) serve as charge generated layer. The charge transfer layer is not necessarily provided on the charge generating layer, but can be provided between the charge generating layer and the conductive support. However, the former structure is preferred from the point of durability.

The charge transfer layer is formed in the similar manner to that for formation of the photosensitive layer of type (3). That is, there may be used the coating composition used for formation of the photosensitive layer of type (3) from which azo pigment is omitted.

Thickness of the charge transfer layer is ordinarily 5-50 μm.

Of course, the photosensitive layer of the electrophotographic photoreceptor of this invention may contain known sensitizers.

Suitable sensitizers include Lewis acids and dyes capable of forming a charge transfer complex with organic photoconductive materials.

As Lewis acids, mention may be made of, for example, quinones such as chloranil, 2,3-dichloro-1,4-naphthoquinone, 2-methylanthraquinone, 1-nitroanthraquinone, 1-chloro-5-nitroanthraquinone, 2-chloroanthraquinone and phenanthrenequinone; aldehydes such as 4-nitrobenzaldehyde; ketones such as 9-benzoylanthracene, indanedione, 3,5-dinitrobenzophenone and 3,3',5,5-tetranitrobenzophenone; acid anhydrides such as phthalic anhydride and 4-chloronaphthalic anhydride; cyano compounds such as tetracyanoethylene, terephthalmalonodinitrile and 4-nitrobenzalmalononitrile; and other electron attractive compounds such as 3-benzalphthalide, 3-(α-cyano-p-nitrobenzal)phthalide and 3-(α-cyano-p-chlorobenzal)phthalide.

As examples of suitable dyes, mention may be made of triphenylmethane dyes such as Methyl Violet, Brilliant Green and Crystal Violet; thiazine dyes such as Methylene Blue; quinone dyes such as Quinizarin; cyanine dyes, pyrylium salts, thiapyrylium salts and benzopyrylium salts.

The photosensitive layer can also contain inorganic photoconductive fine particles such as selenium and selenium-arsenic alloys and organic photoconductive pigments such as copper-phthalocyanine pigments and perylene pigments.

The photosensitive layer of the photoreceptor of this invention can further contain known plasticizers to improve film-forming property, flexibility and mechanical strength. Suitable plasticizers include phthalate esters, phosphate esters, epoxy compounds, chlorinated paraffins, chlorinated fatty acid esters, and aromatic compounds such as alkylated naphthalenes.

The photoreceptor of this invention may, of course, contain, if necessary, an adhesive layer, an intermediate layer, an insulating layer, and a protective layer.

The photoreceptor containing azo pigment according to this invention is high in sensitivity, superior in color sensitivity and upon repeated use shows little change in sensitivity and charge accepting property, little fatigue and excellent durability.

Furthermore, the photoreceptor of this invention can be used not only in electrophotographic copier but also widely in other electrophotographic fields such as printers using lasers, Braun tube (CRT) and light-emitting diodes (LED) as light source.

The following nonlimiting examples further illustrate the invention.

EXAMPLE 1

On a conductive support of a polyester film clad with aluminum foil (ALPET 85 supplied by Daido Kako Co.; 10μ in aluminum foil thickness) was formed a carrier generating layer by coating on said aluminum foil layer an azo pigment dispersion prepared by adding 2 g of the aforementioned azo pigment No. 2 and 1 g of butyral resin (ESUREK B supplied by Sekisui Chemical Co.) in 100 ml of tetrahydrofuran and dispersing in a paint conditioner for about 1 hour, at a dry thickness of 0.3μ. A carrier transfer layer, 19μ in dry thickness, was formed thereon by coating on the carrier generating layer a solution comprising 5 g of N,N-diphenylaminobenzaldehyde-1,1-diphenylhydrazone, a carrier transfer material, and 7 g of a polyarylate resin dissolved in 50 ml of 1,2-dichloroethane and drying the coating to obtain the electrophotographic photoreceptor of this invention. This photoreceptor was left to stand in the dark place at 30° C. for 1 week and then mounted to an electrostatic paper testing apparatus (SP-428 supplied by Kawaguch Denki Seisakusho Co.) and tested for the characteristics in the following manner.

That is, the photosensitive layer was electrostatically charged by subjecting it for 5 seconds to the corona discharge produced by application of a potential of $-6$ KV by a charger and the surface potential $V_o(-V)$ was measured. Then, the charged surface was exposed to a halogen lamp with the illuminance on the surface of the photosensitive layer being 30 lux, and the exposure $E_{\frac{1}{2}}$ (lux·second) necessary to decay the surface potential of the photosensitive layer to $\frac{1}{2}$ was measured.

Further, surface potential after having been exposed with an exposure of 50 lux·second, namely, residual potential $E_{50}(-V)$ was determined. Similar test cycle was repeated 500 times. In each cycle, complete removal of the residual potential was effected by exposing to a tungsten lamp for 0.3 second at 300 lux. The results are shown in Table 1.

TABLE 1

|  | First cycle | 500th cycle |
|---|---|---|
| $V_o(-V)$ | 1040 | 1020 |
| $E_{\frac{1}{2}}$ (lux · sec) | 1.5 | 1.5 |
| $E_{50}(-V)$ | 0-5 | 0 |

EXAMPLES 2-10

Nine photoreceptors of this inventions were prepared in the same manner as in Example 1 except that aforementioned azo pigment Nos. 3, 5, 6, 13, 22, 27, 34, 37 and 44 were used as carrier generating materials. Each photoreceptor was tested for the characteristics as in Example 1. The results are shown in Table 2.

TABLE 2

| | | First cycle | | | 500th cycle | | |
|---|---|---|---|---|---|---|---|
| Example | Azo pigments | $V_o$ (−V) | $E_{\frac{1}{2}}$ (lux · sec) | $E_{50}$ (−V) | $V_o$ (−V) | $E_{\frac{1}{2}}$ (lux · sec) | $E_{50}$ (−V) |
| 2 | Pigment No. 3 | 1090 | 1.9 | 10 | 1080 | 1.9 | 15 |
| 3 | Pigment No. 5 | 990 | 1.2 | 0-5 | 980 | 1.2 | 0 |
| 4 | Pigment No. 6 | 1050 | 1.4 | 0-5 | 1010 | 1.3 | 0 |
| 5 | Pigment No. 13 | 840 | 2.3 | 10-15 | 860 | 2.3 | 20 |
| 6 | Pigment No. 22 | 890 | 1.8 | 5-10 | 820 | 1.6 | 10-15 |
| 7 | Pigment No. 27 | 1030 | 2.0 | 10-15 | 990 | 2.1 | 20 |
| 8 | Pigment No. 34 | 940 | 1.5 | 5-10 | 910 | 1.6 | 15 |
| 9 | Pigment No. 37 | 880 | 1.2 | 0-5 | 850 | 1.2 | 0 |
| 10 | Pigment No. 44 | 980 | 1.3 | 0-5 | 960 | 1.2 | 0 |

EXAMPLE 11

On the outer surface of an aluminum drum having a diameter of 60 mm was formed a carrier generating layer, 0.5μ in dry thickness, by coating a solution obtained by preparing a dispersion by adding 2 g of the aforementioned azo pigment No. 8 to a solution containing 2 g of polyarylate resin dissolved in 100 ml of tetrahydrofuran and dispersing in a paint conditioner for about 3 hours and then further adding to the dispersion 100 ml of tetrahydrofuran and drying the coating. On this carrier generating layer was formed a carrier transfer layer, 15μ in dry thickness, by coating a solution prepared by dissolving 20 g of a carrier transfer material, N,N-diethylaminobenzaldehyde-1-(phenyl)-1-methylhydrazone represented by the following formula:

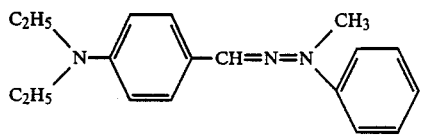

and 20 g of polycarbonate resin (PANLITE L-1250 supplied by Teijin Limited) in 150 ml of 1,2-dichloroethane and then drying the coating to obtain the photoreceptor of this invention.

This electrophotographic photoreceptor was mounted on a commercial business electrophotographic copier, which had been partially modified and reproduction was carried out to obtain a clear image high in contrast and faithful to original.

Reproduction was repeated 1000 times and there were obtained visible images which remained throughout the same in quality as the first copy.

EXAMPLE 12

The drum-type electrophotographic photoreceptor obtained in Example 11 was examined for reflection spectrum by an integrating sphere spectrophotometer (UV-365 of Shimadzu Seisakusho Ltd.). As a result, it was found that the absorption maxima in the visible region were at around 650–690 nm and 600 nm–630 nm.

Figure 3:
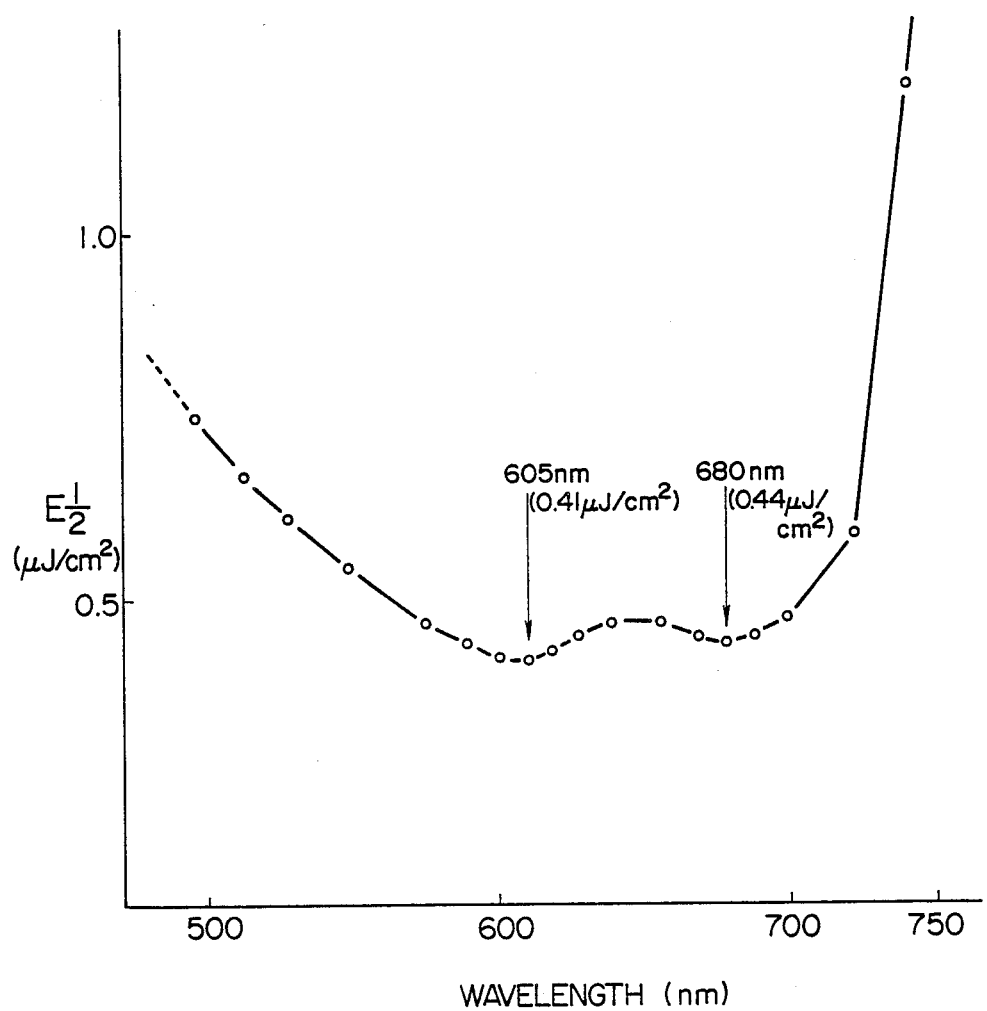
FIG. 3 is a spectral sensitivity curve of the photoreceptor in Example 12.

Further, spectral sensitivity of the photoreceptor in the range of 500 nm–750 nm was measured by a monochromater and the results are shown in FIG. 3. The spectral sensitivity was expressed by energy ($\mu J/cm^2$) required for decaying the potential from $-600$ V to $-300$ V.

It was recognized that the photoreceptor of this invention can endure the actual use under exposure to a light source such as light-emitting diode and He-Ne laser beam.

EXAMPLE 13

A styrene-n-butyl methacrylate-methacrylic acid copolymer (styrene:n-butyl methacrylate=1:2 (weight ratio) and acid value: 250), the aforementioned azo pigment No. 6 and 2-phenyl-1-ethylindole-3-aldehyde 1,1-diphenylhydrazone were mixed at a weight ratio of 1.5:0.2:1.1. A coating composition was prepared from said mixture and dioxane (the resin component and the hydrazone compound were dissolved while the azo pigment was dispersed in the dioxane) and this coating composition was coated on a surface of oxidized and grained Al plate and dried to produce a single-layer type photoreceptor of 6μ in film thickness. The resulting photoreceptor was tested for the electrophotographic characteristics by the above used electrostatic paper testing apparatus to obtain the following results.

Applied potential: +6 KV.
$V_o$=520 volt.
$E_{\frac{1}{2}}$=3.9 lux·sec.

The photoreceptor was subjected to development treatment with a developer (toner) to form a visible image, then treated with an alkaline processing aqueous solution (e.g. a solution containing 3% of triethanolamine, 10% of sodium acetate, 15% of polyethylene glycol having an average molecular weight of 190–210 and 5% benzyl alcohol) to dissolve the photosensitive layer in non-image areas and washed with water containing sodium silicate to obtain a printing plate.

Offset printing was carried out using this printing plate to find that this printing plate was able to stand printing of about 100,000 copies.

The optimum amount of exposure to obtain the visible toner images was 100 lux·sec (light source: halogen lamp). The printing plate was directly made without using a block copy.

EXAMPLE 14

On a conductive support of a polyester film clad with aluminum foil (ALPET 85 supplied by Daido Kako Co.; 10μ in aluminum foil thickness) was formed a carrier generating layer by coating an azo pigment dispersion prepared by adding 2 g of the afore-mentioned azo pigment No. 73 and 1 g of a butyral resin (K-3000 supplied by Denki Kagaku Kogyo Co.) in 100 ml of tetrahydrofuran and dispersing in a paint conditioner for about 1 hour, at a dry thickness of 0.3μ. A carrier transfer layer, 19μ in dry thickness, was formed thereon by coating on the carrier generating layer a solution comprising 5 g of N,N-dibenzylaminobenzaldehyde-1,1-diphenylhydrazone, a carrier transfer material, and 6 g of a polyarylate resin dissolved in 50 ml of monochlorobenzene and drying the coating to obtain the electrophotographic photoreceptor of this invention. This photoreceptor was left to stand in the dark place at 30° C. for 1 week and then mounted on an electrostatic paper testing apparatus (SP-428 supplied by Kawaguchi Denki Seisakusho Co.) and tested for the characteristics in the following manner.

That is, the photosensitive layer was electrostatically charged by subjecting it for 5 seconds to the corona discharge produced by application of a potential of $-6$ KV by a charger and the surface potential $V_o(-V)$ was measured. Then, the charged surface was exposed to a halogen lamp with the illuminance on the surface of the photosensitive layer being 30 lux, and the exposure $E_{\frac{1}{2}}$ (lux·second) necessary to decay the surface potential of the photosensitive layer to $\frac{1}{2}$ was measured.

Further, surface potential after having been exposed with an exposure of 50 lux·second, namely, residual potential $E_{50}$ ($-V$) was determined. Similar test cycle was repeated 500 times. In each cycle, complete removal of the residual potential was effected by exposing to a tungsten lamp for 0.3 second at 300 lux. The results are shown in Table 3.

TABLE 3

|  | First cycle | 500th cycle |
|---|---|---|
| $V_o$ (−V) | 960 | 940 |
| $E_{\frac{1}{2}}$ (lux · sec) | 1.4 | 1.4 |
| $E_{50}$ (−V) | 0–5 | 0 |

EXAMPLES 15-23

Nine photoreceptors of this inventions were prepared in the same manner as in Example 14 except that aforementioned azo pigment Nos. 47, 50, 52, 57, 58, 67, 73, 81 and 86 were used as carrier generating materials. Each photoreceptor was tested for the characteristics as in Example 14. The results are shown in Table 4.

TABLE 4

| Example | Azo pigments | First cycle $V_o$ (−V) | First cycle $E_{\frac{1}{2}}$ (lux·sec) | First cycle $E_{50}$ (−V) | 1000th cycle $V_o$ (−V) | 1000th cycle $E_{\frac{1}{2}}$ (lux·sec) | 1000th cycle $E_{50}$ (−V) |
|---|---|---|---|---|---|---|---|
| 15 | Pigment No. 47 | 870 | 4.9 | 25 | 860 | 4.8 | 40 |
| 16 | Pigment No. 50 | 890 | 3.8 | 15 | 870 | 3.9 | 25 |
| 17 | Pigment No. 52 | 915 | 2.2 | 10 | 900 | 2.2 | 15–20 |
| 18 | Pigment No. 57 | 850 | 4.8 | 25–30 | 810 | 5.0 | 40–45 |
| 19 | Pigment No. 58 | 810 | 3.2 | 20 | 800 | 3.3 | 35–40 |
| 20 | Pigment No. 67 | 870 | 5.4 | 15 | 850 | 5.6 | 50 |
| 21 | Pigment No. 73 | 900 | 1.8 | 10 | 880 | 1.7 | 20 |
| 22 | Pigment No. 81 | 820 | 1.3 | 0–5 | 790 | 1.3 | 5–10 |
| 23 | Pigment No. 86 | 790 | 2.2 | 0–5 | 740 | 2.1 | 5 |

EXAMPLE 24

On the outer surface of an aluminum drum having a diameter of 60 mm was formed a carrier generating layer, 0.4μ in dry thickness, by coating a dispersion prepared by adding 2 g of the aforementioned azo pigment No. 66 to a solution containing 2 g of polyarylate resin dissolved in 50 ml of tetrahydrofuran, dispersing in a paint conditioner for about 3 hours, then further adding to the dispersion 150 ml of tetrahydrofuran and again dispersing it and drying the coating. On this carrier generating layer was formed a carrier transfer layer, 15μ in dry thickness, by coating a solution prepared by dissolving 10 g of a carrier transfer material, N,N-dibenzylaminobenzaldehyde-1,1-diphenylhydrazone represented by the following formula:

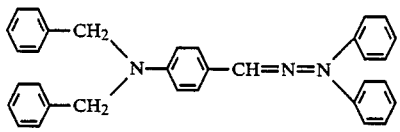

and 12 g of polycarbonate resin (PANLITE L-1300 supplied by Teijin Limited) in 100 ml of 1,2-dichloroethane and then drying the coating to obtain the photoreceptor of this invention.

This electrophotographic photoreceptor was mounted on a commercial electrophotographic copier of the cartridge type, which had been partially modified and reproduction was carried out to obtain a clear image high in contrast and faithful to original.

Reproduction was repeated 1000 times and there were obtained visible images which remained throughout the same in quality as the first copy.

EXAMPLE 25

The drum-type electrophotographic photoreceptor obtained in Example 24 was examined for reflection spectrum by an integrating sphere spectrophotometer (UV-365 of Shimadzu Seisakusho Ltd.). As a result, it was found that the absorption maxima in the visible region were at around 650–690 nm.

Figure 5:
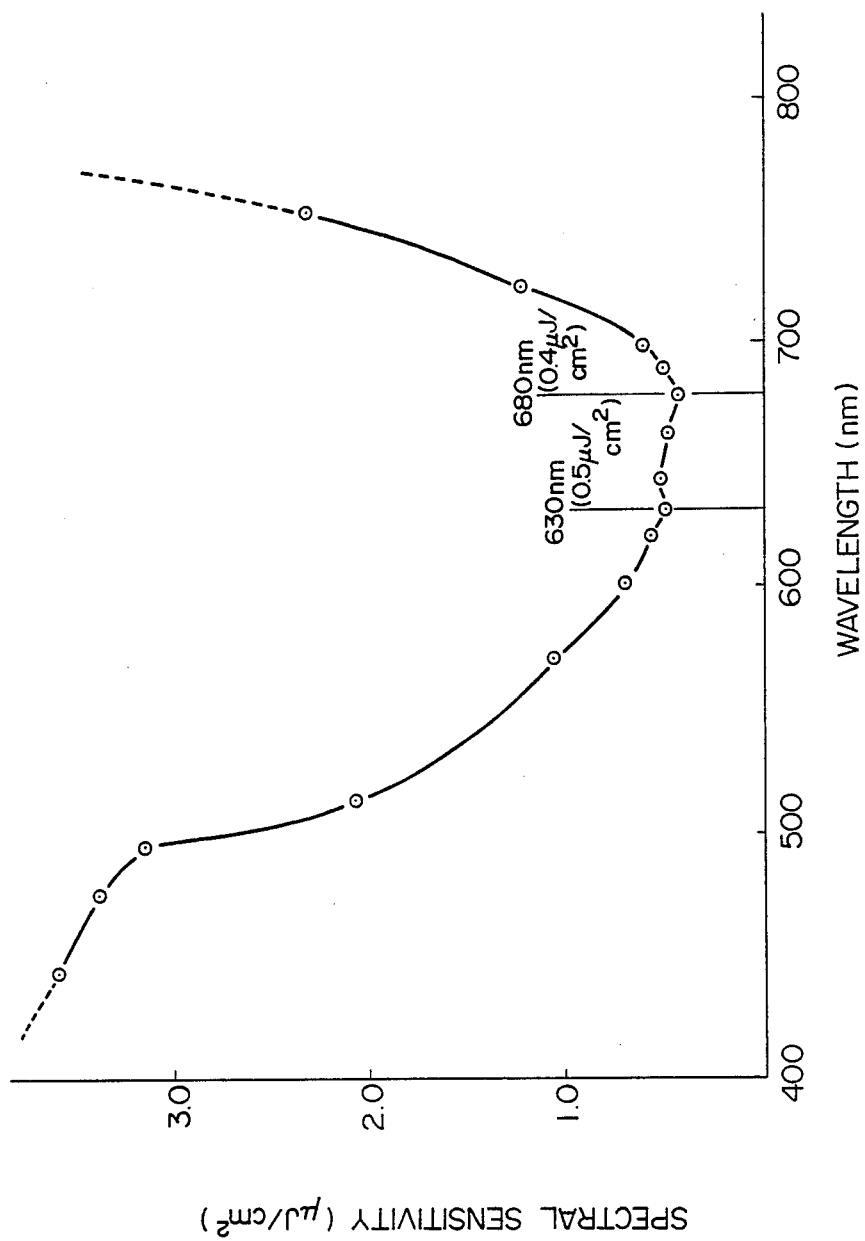
FIG. 5 is a spectral sensitivity curve of the photoreceptor in Example 25.

Further, spectral sensitivity of the photoreceptor in the rainge of 450 nm–750 nm was measured by a monochromater and the results are shown in FIG. 5.

It was recognized that the photoreceptor of this invention can endure the actual use under exposure to a light source such as light-emitting diode and He-Ne laser beam.

EXAMPLE 26

A styrene-n-butyl methacrylate-methacrylic acid copolymer (styrene:n-butyl methacrylate=1:2 (weight ratio) and acid value: 250), the aforementioned azo pigment No. 81 and 2-phenyl-1-ethylindole-3-aldehyde 1,1-diphenylhydrazone were mixed at a weight ratio of 1.5:0.2:1.1. A coating composition was prepared from said mixture and dioxane (the resin component and the hydrazone compound were dissolved while the azo pigment was dispersed in the dioxane) and this coating composition was coated on a surface of oxidized and grained Al plate and dried to produce a single-layer type photoreceptor of 6μ in film thickness. The resulting photoreceptor was tested for the electrophotographic characteristics by the above used electrostatic paper testing apparatus to obtain the following results.

Applied potential: +6 KV.
$V_o$=520 volt.
$E_{\frac{1}{2}}$=4.1 lux·sec.

The photoreceptor was subjected to development treatment withe a developer (toner) to form a visible image, then treated with an alkaline processing aqueous solution (e.g. a solution containing 3% of triethanolamine, 10% of ammonium carbonate, 15% of polyethylene glycol having an average molecular weight of 190–210 and 5% of benzyl alcohol) to dissolve the photosensitive layer in non-image areas and washed with water containing sodium silicate to obtain a printing plate. Offset printing was carried out using this printing plate to find that this printing plate was able to stand printing of about 100,000 copies.

The optimum amountof exposure to obtain the visible toner images was 150 lux·sec (light source: halogen lamp). The printing plate was directly made without using a block copy.

EXAMPLE 27

On a conductive support of a polyester film clad with aluminum foil (ALPET 85 supplied by Daido Kako Co.; 10μ in aluminum foil thickness) was formed a carrier generating layer by coating an azo pigment dispersion prepared by adding 2 g of the aforementioned azo pigment No. 89 and 1 g of a butyral resin (ESUREK B supplied by Sekisui Chemical Co.) in 100 ml of tetrahydrofuran and dispersing in a paint conditioner for about 1 hour, at a dry thickness of 0.3μ. A carrier transfer layer, 19μ in dry thickness, was formed thereon by coating on the carrier generating layer a solution comprising 5 g of N,N-dibenzylaminobenzaldehyde-1,1-diphenylhydrazone, a carrier transfer material, and 7 g of a polyarylate resin dissolved in 50 ml of 1,2-dichloroethane and drying the coating to obtain the electrophotographic photoreceptor of this invention. This photoreceptor was left to stand in the dark place at 30° C. for 1 week and then mounted on an electrostatic paper testing apparatus (SP-428 supplied by Kawaguchi Denki Seisakusho Co.) and tested for the characteristics in the following manner.

That is, the photosensitive layer was electrostatically charged by subjecting it for 5 seconds to the corona discharge produced by application of a potential of −6 KV by a charger and the surface potential $V_o$ (−V) was measured. Then, the charged surface was exposed to a halogen lamp with the illuminance on the surface of the photosensitive layer being 30 lux, and the exposure $E_{\frac{1}{2}}$ (lux·second) necessary to decay the surface potential of the photosensitive layer to $\frac{1}{2}$ was measured.

Further, surface potential after having been exposed with an exposure of 50 lux·second, namely, residual potential $E_{50}$ (−V) was determined. Similar test cycle was repeated 500 times. In each cycle, complete removal of the residual potential was effected by exposing to a tungsten lamp for 0.3 second at 300 lux. The results are shown in Table 5.

TABLE 5

|  | First cycle | 500th cycle |
|---|---|---|
| $V_o$ (−V) | 1040 | 1020 |
| $E_{\frac{1}{2}}$ (lux · sec) | 1.5 | 1.5 |
| $E_{50}$ (−V) | 0–5 | 0 |

EXAMPLES 28–36

Nine photoreceptors of this inventions were prepared in the same manner as in Example 27 except that aforementioned azo pigment Nos. 88, 92, 93, 100, 106, 109, 113, 121, and 127 were used as carrier generating materials. Each photoreceptor was tested for the characteristics as in Example 27. The results are shown in Table 6.

TABLE 6

| | | First cycle | | | 500th cycle | | |
|---|---|---|---|---|---|---|---|
| Example | Azo pigments | $V_o$ (−V) | $E_{\frac{1}{2}}$ (lux · sec) | $E_{50}$ (−V) | $V_o$ (−V) | $E_{\frac{1}{2}}$ (lux · sec) | $E_{50}$ (−V) |
| 28 | Pigment No. 88 | 1090 | 1.9 | 10 | 1080 | 1.9 | 0–5 |
| 29 | Pigment No. 92 | 990 | 1.2 | 0–5 | 980 | 1.2 | 0 |
| 30 | Pigment No. 93 | 1050 | 1.4 | 0–5 | 1010 | 1.3 | 0 |
| 31 | Pigment No. 100 | 840 | 2.3 | 10–15 | 860 | 2.3 | 15 |
| 32 | Pigment No. 106 | 890 | 1.8 | 5–10 | 880 | 1.8 | 10 |
| 33 | Pigment No. 109 | 1030 | 2.0 | 10–15 | 990 | 2.1 | 15 |
| 34 | Pigment No. 113 | 940 | 1.5 | 5–10 | 910 | 1.5 | 10 |
| 35 | Pigment No. 121 | 1080 | 1.2 | 0–5 | 1050 | 1.2 | 0 |
| 36 | Pigment No. 127 | 980 | 1.3 | 0–5 | 980 | 1.2 | 0 |

EXAMPLE 37

On the outer surface of an aluminum drum having a diameter of 60 mm was formed a carrier generating layer, 0.5μ in dry thickness, by coating on the intermediate layer a solution obtained by preparing a dispersion by adding 2 g of the aforementioned azo pigment No. 98 to a solution containing 2 g of polyarylate resin dissolved in 200 ml of tetrahydrofuran and dispersing in a paint conditioner for about 3 hours and then further adding to the dispersion 200 ml of tetrahydrofuran and drying the coating. On this carrier generating layer was formed a carrier transfer layer, 15μ in dry thickness, by coating a solution prepared by dissolving 20 g of a carrier transfer material, N-benzylN, ethylaminobenzaldehyde-1-(phenyl)-1-methylhydrazone represented by the following formula:

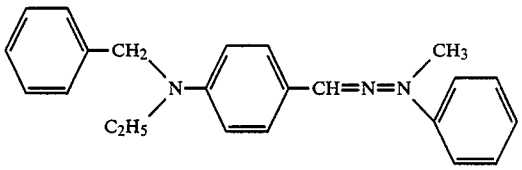

and 20 g of polycarbonate resin (PANLITE L-1250 supplied by Teijin Limited) in 150 ml of 1,2-dichloroethane and then drying the coating to obtain the photoreceptor of this invention.

This electrophotographic photoreceptor was mounted on a commercial business electrophotographic copier, which had been partially modified and reproduction was carried out to obtain a clear image high in contrast and faithful to original.

Reproduction was repeated 1000 times and there were obtained visible images which remained throughout the same in quality as the first copy.

EXAMPLE 38

The drum-type electrophotographic photoreceptor obtained in Example 37 was examined for reflection spectrum by an integrating sphere spectrophotometer (UV-365 of Shimadzu Seisakusho Ltd.). As a result, it was found that the absorption maxima in the visible region were at around 660–680 nm and 730 nm–750 nm.

Figure 6:
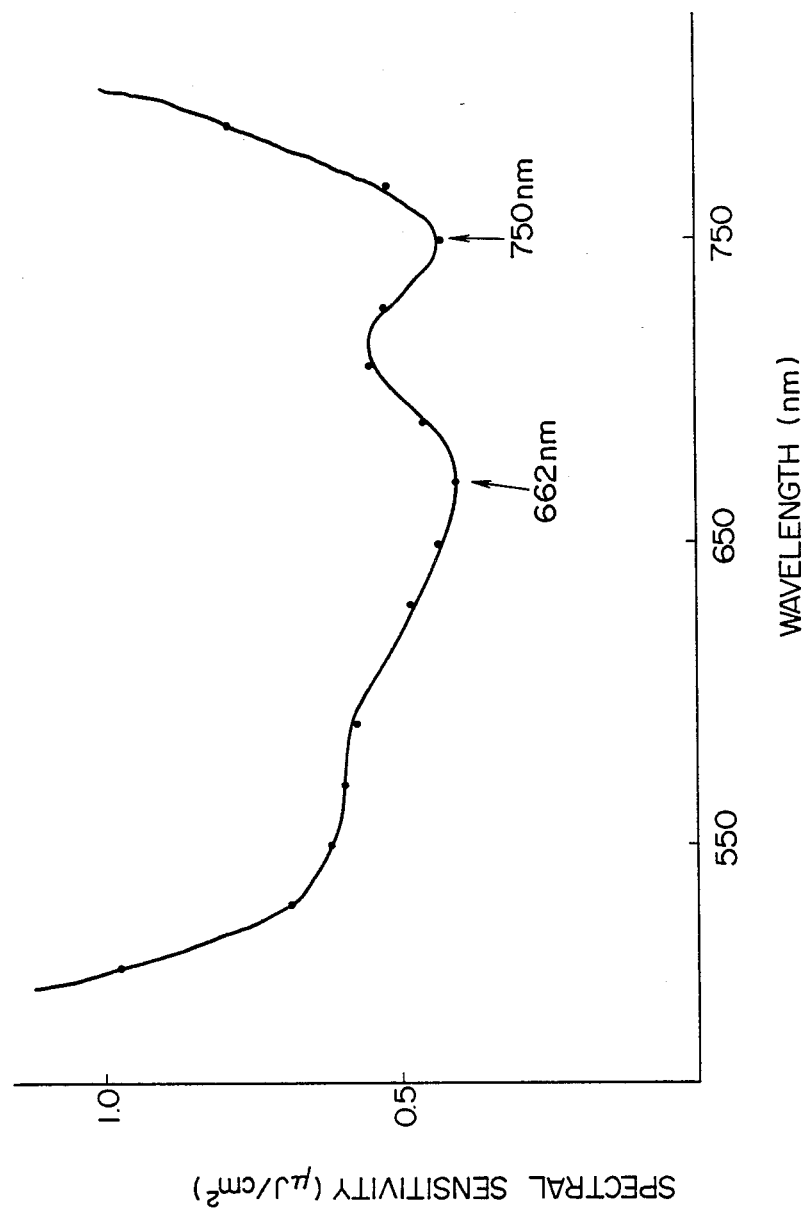
FIG. 6 is a spectral sensitivity curve of the photoreceptor in Example 38.

Further, spectral sensitivity of the photoreceptor in the range of 500 nm–780 nm was measured by a monochromater and the results are shown in FIG. 6 The spectral sensitivity was expressed by energy (μJ/cm$^2$) required for decaying the potential from −700 V to 350 V.

It was recognized that the photoreceptor of this invention can endure the actual use under exposure to a light source such as light-emitting diode and He-Ne laser beam.

EXAMPLE 39

A styrene-n-butyl methacrylate-methacrylic acid copolymer (styrene:n-butyl methacrylate=1:2 (weight ratio) and acid value: 250), the aforementioned azo pigment No. 93 and 2-phenyl-1-ethylindole-3-aldehyde 1,1-diphenylhydrazone were mixed at a weight ratio of 1.5:0.2:1.1. A coating composition was prepared from said mixture and dioxane (the resin component and the hydrazone compound were dissolved while the azo pigment was dispersed in the dioxane) and this coating composition was coated on a surface of oxidized and grained Al plate and dried to produce a single-layer type photoreceptor of 6μ in film thickness. The resulting photoreceptor was tested for the electrophotographic characteristics by the above used electrostatic paper testing apparatus to obtain the following results.

Applied potential: +6 KV.
$V_o$=520 volt.
$E_{\frac{1}{2}}$=3.9 lux·sec.

The photoreceptor was subjected to development treatment with a developer (toner) to form a visible image, then treated with an alkaline processing aqueous solution (e.g. 3% of triethanolamine, 10% of ammonium carbonate, 15% of polyethylene glycol having an averrage molecular weight of 190–210 and 5% of benzyl alcohol) to dissolve the photosensitive layer in non-image areas and washed with water containing sodium silicate to obtain a printing plate.

Offset printing was carried out using this printing plate to find that this printing plate was able to stand printing of about 100,000 copies.

The optimum amount of exposure to obtain the visible toner images was 100 lux·sec (light source: halogen lamp). The printing plate was directly made without using a block copy.

What is claimed is:

1. An electrophotographic photoreceptor which comprises an electroconductive support and, provided thereon, a photosensitive layer containing an azo pigment represented by the formula [I]:

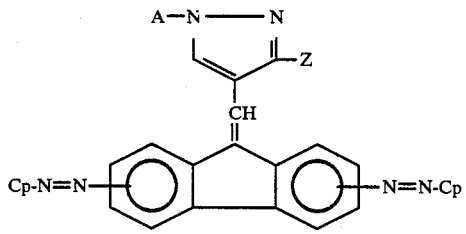

wherein A represents an aryl group, a heterocyclic group or an alkyl group, Z represents a hydrogen atom, —B or —CH=CH—B wherein B represents an aryl group, a heterocyclic group or an alkyl group and Cp represents a coupler residue.

2. An electrophotographic photoreceptor according to claim 1 wherein the azo pigment is represented by the following formula:

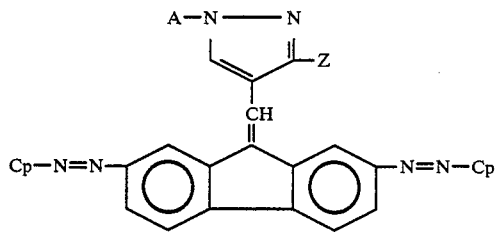

wherein A, Z and Cp are as defined above.

3. An electrophotographic photoreceptor according to claim 1 wherein the photosensitive layer contains a charge transfer material and a charge generating material which is the azo pigment represented by the formula [I].

* * * * *